United States Patent
Doshi et al.

(10) Patent No.: US 12,363,026 B2
(45) Date of Patent: Jul. 15, 2025

(54) SOFTWARE DEFINED NETWORKING WITH EN-ROUTE COMPUTING

(71) Applicant: Intel Corporation, Santa Clara, CA (US)

(72) Inventors: Kshitij Arun Doshi, Tempe, AZ (US);
S M Iftekharul Alam, Hillsboro, OR (US); Francesc Guim Bernat, Barcelona (ES); Satish Chandra Jha, Portland, OR (US); Vesh Raj Sharma Banjade, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 17/483,490

(22) Filed: Sep. 23, 2021

(65) Prior Publication Data
US 2022/0021608 A1    Jan. 20, 2022

(51) Int. Cl.
*H04L 45/12* (2022.01)
*H04L 45/00* (2022.01)
*H04L 45/02* (2022.01)
*H04L 45/42* (2022.01)
*H04L 45/74* (2022.01)

(52) U.S. Cl.
CPC ........... *H04L 45/123* (2013.01); *H04L 45/02* (2013.01); *H04L 45/124* (2013.01); *H04L 45/20* (2013.01); *H04L 45/22* (2013.01); *H04L 45/42* (2013.01); *H04L 45/742* (2013.01)

(58) Field of Classification Search
CPC ....... H04L 45/42; H04L 45/02; H04L 45/123; H04L 45/20; H04L 45/22; H04L 45/742; H04L 45/124
See application file for complete search history.

(56) References Cited

U.S. PATENT DOCUMENTS

| | | | |
|---|---|---|---|
| 10,397,117 B2 | 8/2019 | Larose et al. | |
| 2012/0054852 A1* | 3/2012 | Gibbs | H04W 12/03 370/252 |

(Continued)

FOREIGN PATENT DOCUMENTS

| | | |
|---|---|---|
| EP | 0892531 | 1/1999 |
| EP | 4156637 | 6/2024 |

OTHER PUBLICATIONS

Król et al., "NFaaS: Named Function as a Service", In Proceedings of ICN '17, Berlin, Germany, Sep. 26-28, 2017, 11 pages. (Year: 2017).*

(Continued)

*Primary Examiner* — Brian J. Gillis
*Assistant Examiner* — Chhian (Amy) Ling
(74) *Attorney, Agent, or Firm* — Schwegman Lundberg & Woessner, P.A.

(57) ABSTRACT

Various aspects of methods, systems, and use cases include en-route computing coordination. A method may include receiving a packet including a compute task and context information, identifying a destination node for the packet, and determining a route for the packet to the destination node. The route may include an intermediary node determined based on the context information and available resources at the intermediary node to execute the compute task of the packet at the intermediary node. The method may include forwarding the packet to a next device along the route.

25 Claims, 22 Drawing Sheets

(56) References Cited

U.S. PATENT DOCUMENTS

| | | | |
|---|---|---|---|
| 2014/0126354 A1* | 5/2014 | Hui | H04L 49/25 370/225 |
| 2014/0334488 A1 | 11/2014 | Guichard et al. | |
| 2015/0381407 A1* | 12/2015 | Wang | H04L 41/0668 370/221 |
| 2021/0111956 A1* | 4/2021 | Phillips | H04L 41/0816 |
| 2021/0258855 A1* | 8/2021 | Bartell | H04L 45/02 |
| 2021/0297337 A1* | 9/2021 | Khan | H04L 45/02 |

OTHER PUBLICATIONS

CAFC Alert, "Means-Plus-Function: The Achilles' Heel, *Noah Systems, Inc.* v. *Intuit, Inc.*", Lessons on Claim & Specification Drafting, Litigation Strategies and more, May 9, 2012. (Year: 2012).*

"European Application Serial No. 22191404.7, Extended European Search Report mailed Nov. 9, 2022", 10 pgs.

"European Application Serial No. 22191404.7, Response filed Sep. 26, 2023 to Office Action mailed Apr. 3, 2023", 17 pgs.

* cited by examiner

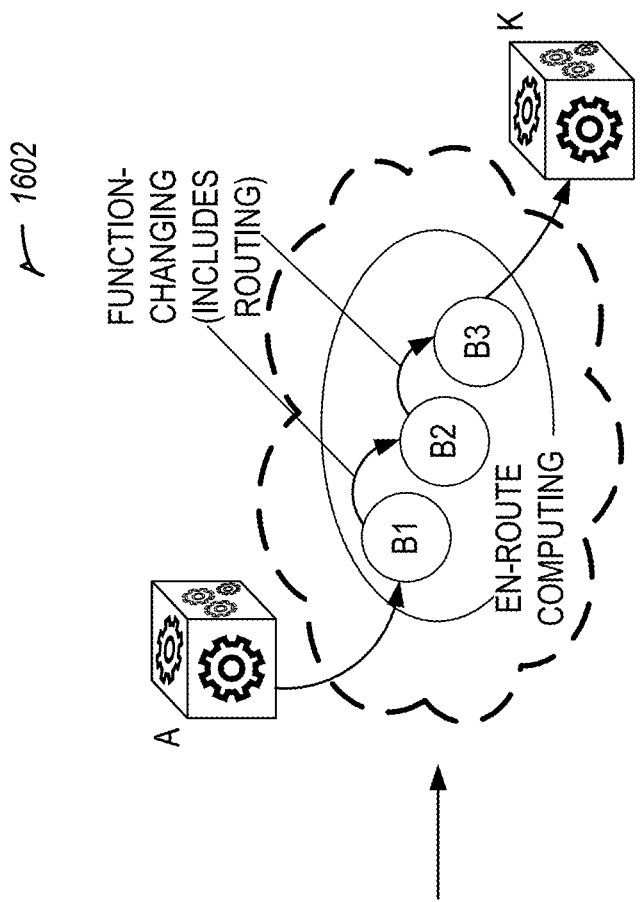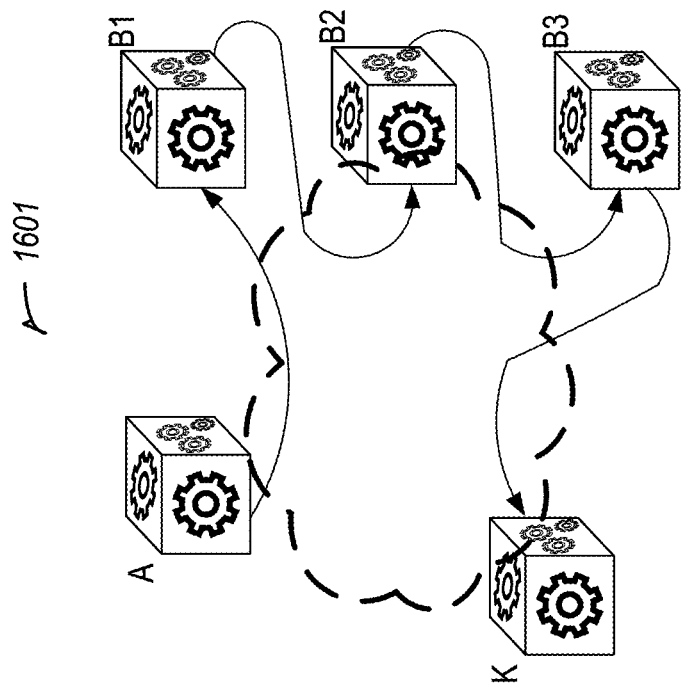
FIG. 16

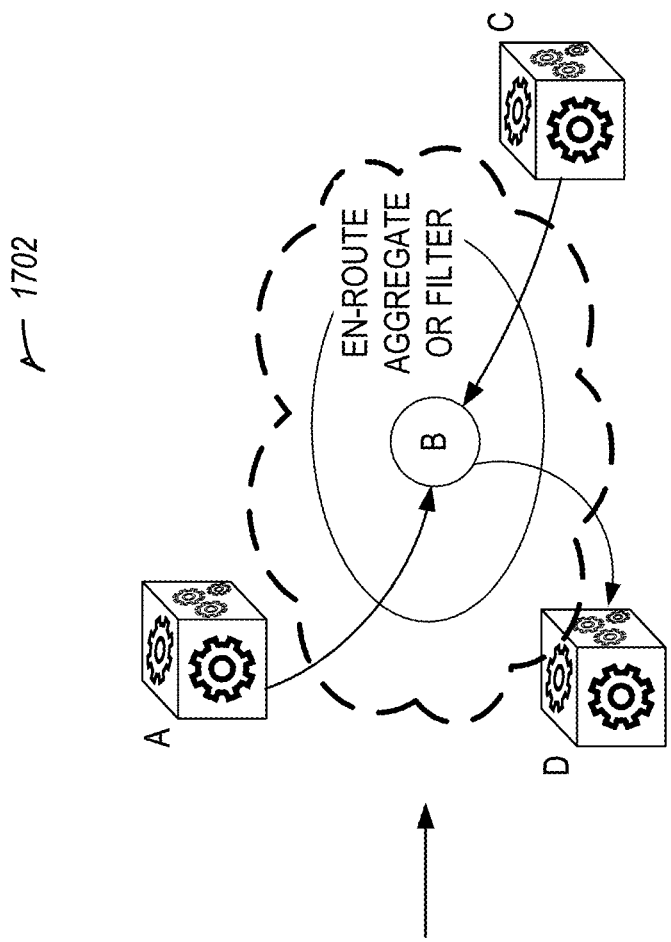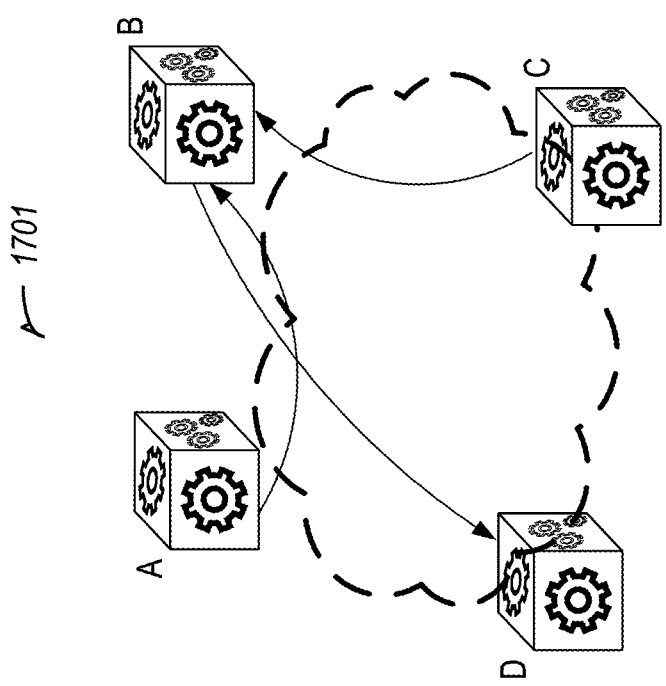
FIG. 17

SOFTWARE DEFINED NETWORKING WITH EN-ROUTE COMPUTING

BACKGROUND

In a data center environment, programmable flow and routing elements operate on streams of packets and perform various local actions, which may generically be described as network functions, while software defined networking layers orchestrate end-to-end nesting, routing, and protocol bridging.

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 16 illustrates example implementations of a chain of compute operations at the application level according to an example.

FIG. 17 illustrates example implementations of an aggregation, filtering, or blending compute operation according to an example.

DETAILED DESCRIPTION

Figure 1:
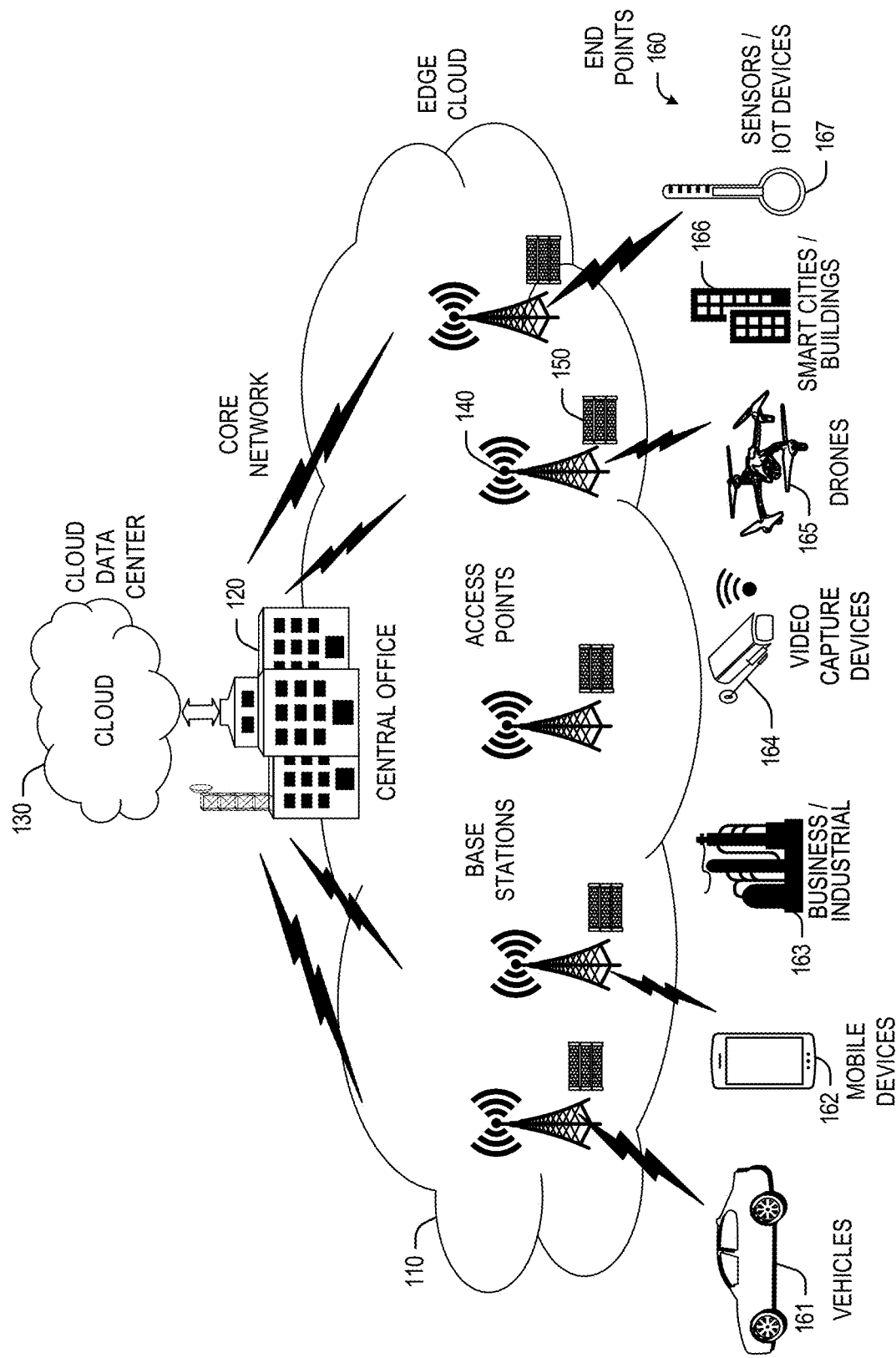
FIG. 1 illustrates an overview of an edge cloud configuration for edge computing.

Computation and communication are increasingly intertwined, and resiliency and latency in end-to-end routes are increasingly a function of how well computation and communication are co-optimized. In a data center environment, programmable flow and routing elements operate on streams of packets and perform various local actions, which may generically be described as network functions, while software-defined networking layers orchestrate end-to-end nesting, routing, and protocol bridging.

Processing that relies on access to a considerable amount of state is typically moved to endpoints, even if the amount of computation performed is modest and independent of whether a large or small amount of state is needed. Processing that is best suited for an accelerator is also frequently organized at network endpoints. As monolithic applications become more modularized into chains of operations, when each of the operations requires servers, the network or networks between servers become latency and bandwidth hotspots. Computation overheads associated with communication, such as cryptographic operations, protocol processing, and serialization or deserialization, may all contribute to inefficiencies, latencies, and vulnerabilities. The systems and techniques described herein combine computation and communication into co-composed and co-optimized orchestration.

Both software defined networking (SDN) and software defined compute (SDC) are very active areas of development across the computing industry. Middleboxes are widely deployed across both private and public networks for security and performance improvements, and at the far edge in the form of integrated firewalls and network address translation (NAT) capabilities.

Existing networks lack integrated software-defined composition and operation of SDN and SDC. When computational capabilities in the form of programmable functions are added to a network element such as a switch, these capabilities are treated as features of the switch rather than those of the network within which the switch operates. Because of this treatment, the computational assets tend to be exercised for a narrow range of packet/message grained computations that are performed in-band with a switch's main function of routing, which limits the variety of computations that the computational capabilities may be brought to bear. This treatment causes switches, particularly those employed at a spine and close to spine level to carry very large volumes of traffic and at low latency, and the in-band computations need to be very low latency, and thus require high-cost specialization, as opposed to utility computing provided at endpoint servers. While the routing or forwarding behaviors of network devices like switches are controlled by SDN policies, the exercise of any computational assets at those devices is largely outside the compass of an orchestration framework such as Kubernetes (K8S), an open-source container-orchestration system for automating computer application deployment, scaling, and management.

The systems and methods described herein deploy programmable network intermediaries to solve these technical problems. The network intermediaries may be used to host WebAssembly (WASM) based, run-to-completion functions, which may be stateful. The compute at a network intermediary may be supplied by, for example, numerous low frequency and dense microCPUs (e.g., arrays of small cores at low frequencies) which allows for reduced switching and run-to-completion actions. The arrays may include clusters of specialization, for example including CPUs designed for low latency (e.g., Xeon cores, at high frequencies), or select acceleration capabilities for emerging acceleration-intensive compute such as artificial intelligence (AI). The compute may be enhanced with one or more clusters providing high density non-volatile memory (NVM) for resiliency and for consistent state updates, such as those that may be completed at very low latency. The updates may be log-replicated or execution-replicated at peer intermediaries, such as to survive Fault, Attack, Failure, Outage (FAFO) events (e.g., things that may cause resiliency problems). In an example, network slicing may be used.

The protocols used for these compute functions support efficient function chaining through hardware specializations like dynamic load balancing (DLB), and may create self-transforming grids which reduce the need for costly and inflexible end to end tunnels (an example is in reference to FIG. 16 below). The integrated stateful serverless computations may furnish primitives for time-sensitive, time-coordinated computing of chained functions.

These systems and techniques may save routing steps or overheads, reduce data movement or associated encryption, or network processing overheads. These en-route and relocatable functions may furnish APIs for high performance resilient key-value services based in NVM, such that low latency transactional updates may buffer on behalf of both low-latency stateful serverless computations and on behalf of end-point applications that need to use the network itself for low-latency durability and recoverability instead of doing so by help of peer endpoint services.

A network may provide multiple points of intermediate computations and low-latency storage, with an API that is exposed through integrated SDN-SDC framework. Very high resiliency is available to both SDN operations and endpoint applications in the network. The network may integrate offloading for endpoint computations that may not need to traverse the whole network, such as by embedding such computations within the network fabric. This enables joint optimization of computing and communication, in contrast to traditional SDN frameworks that focus on optimization of an end-to-end communication path only. In addition to providing high resiliency, the systems and techniques described herein may improve several key performance indicators (such as latency reduction, traffic reduction, throughput improvement etc.) for applications while improving the utilization of both networking and in-network computing resources. An associated benefit includes upgrades to compute capacity, which may be performed not only at endpoints (e.g., servers) but also within the network fabric, because the en-route computing capabilities are presented in a location agnostic manner to applications, are provided without complicating the in-band-flows in high throughput switches, and are secure by design (e.g., via WASM, and secure provisioning of location agnostic infrastructure services that is abstracted via an enhanced SDN interface that incorporates this in-the-flow SDC).

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
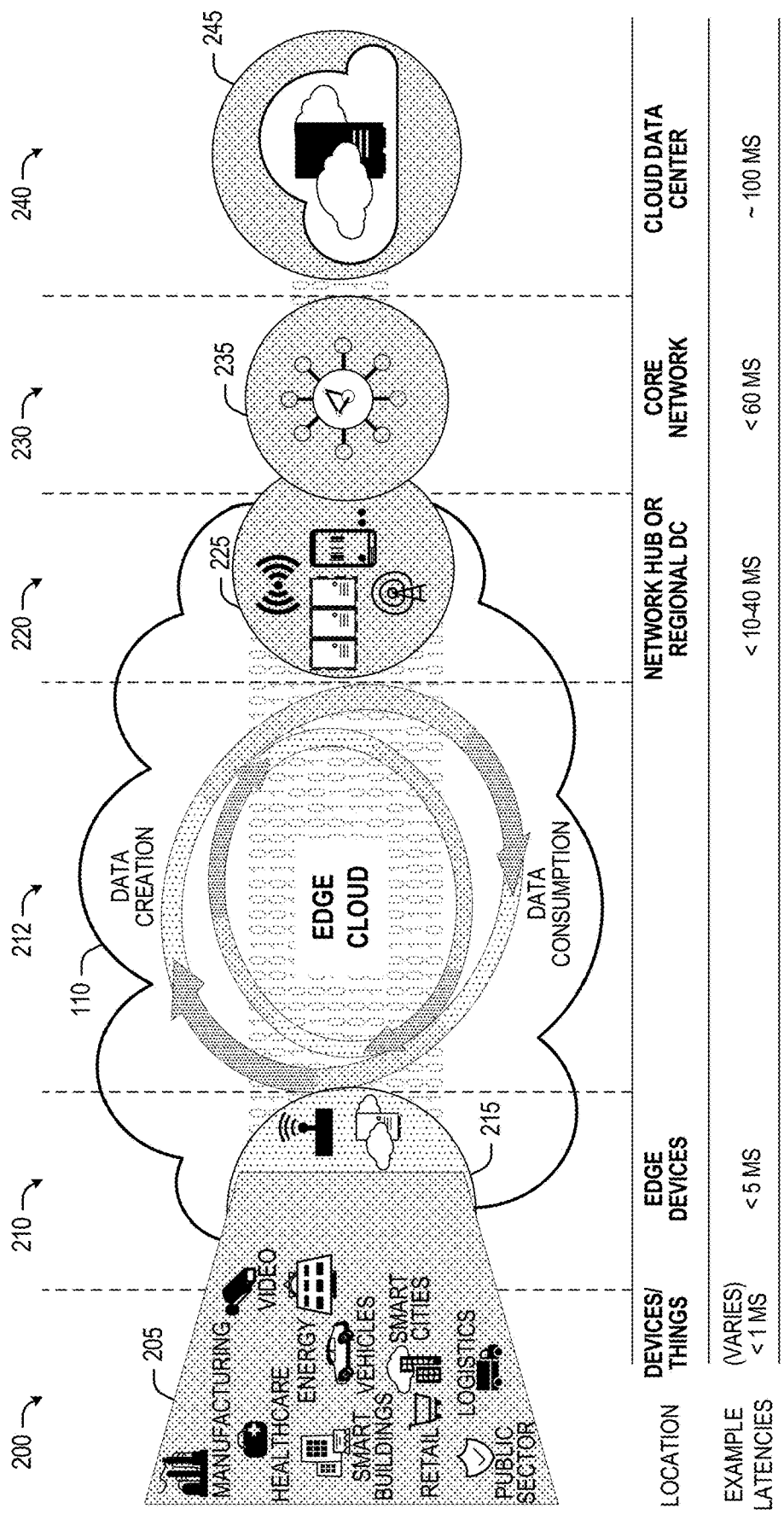
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
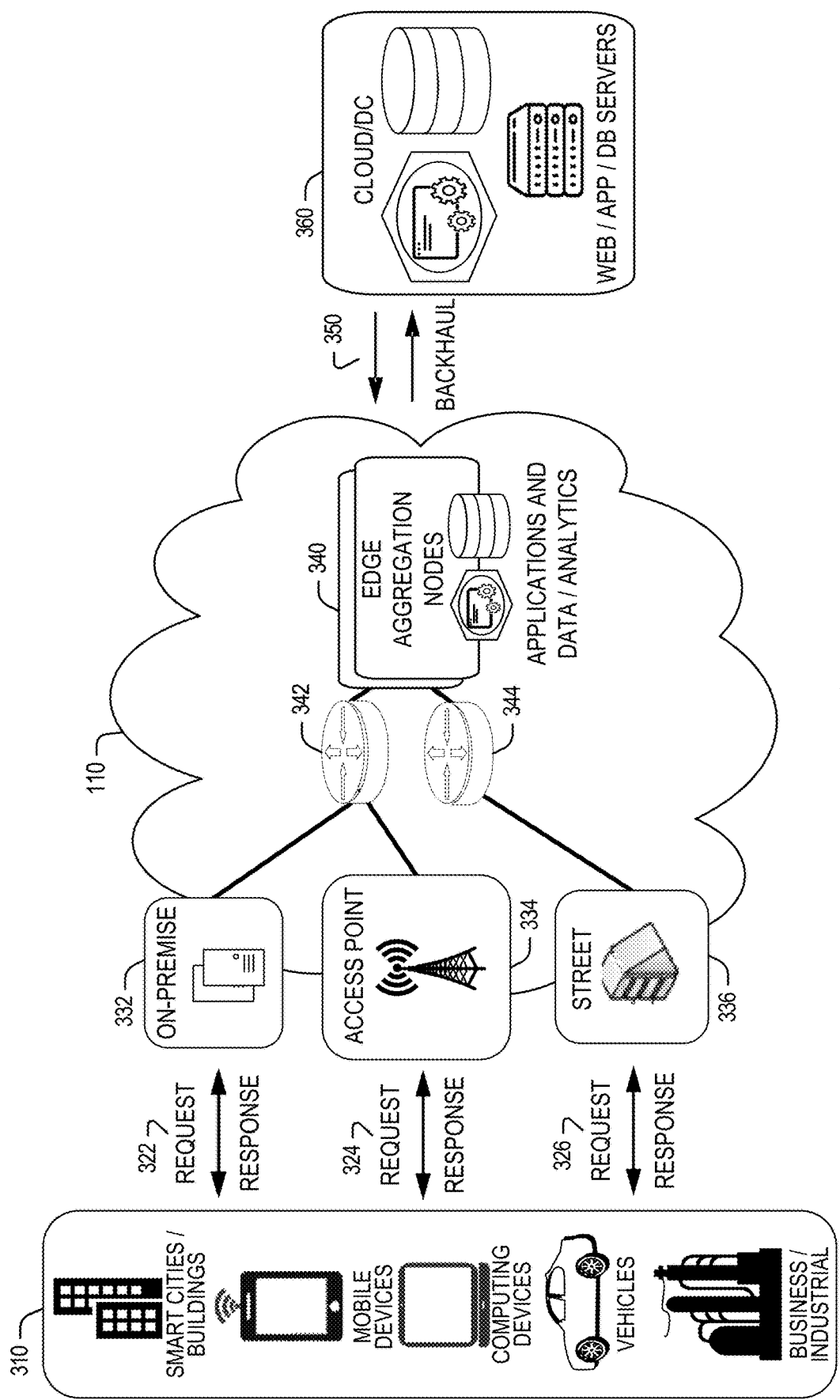
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
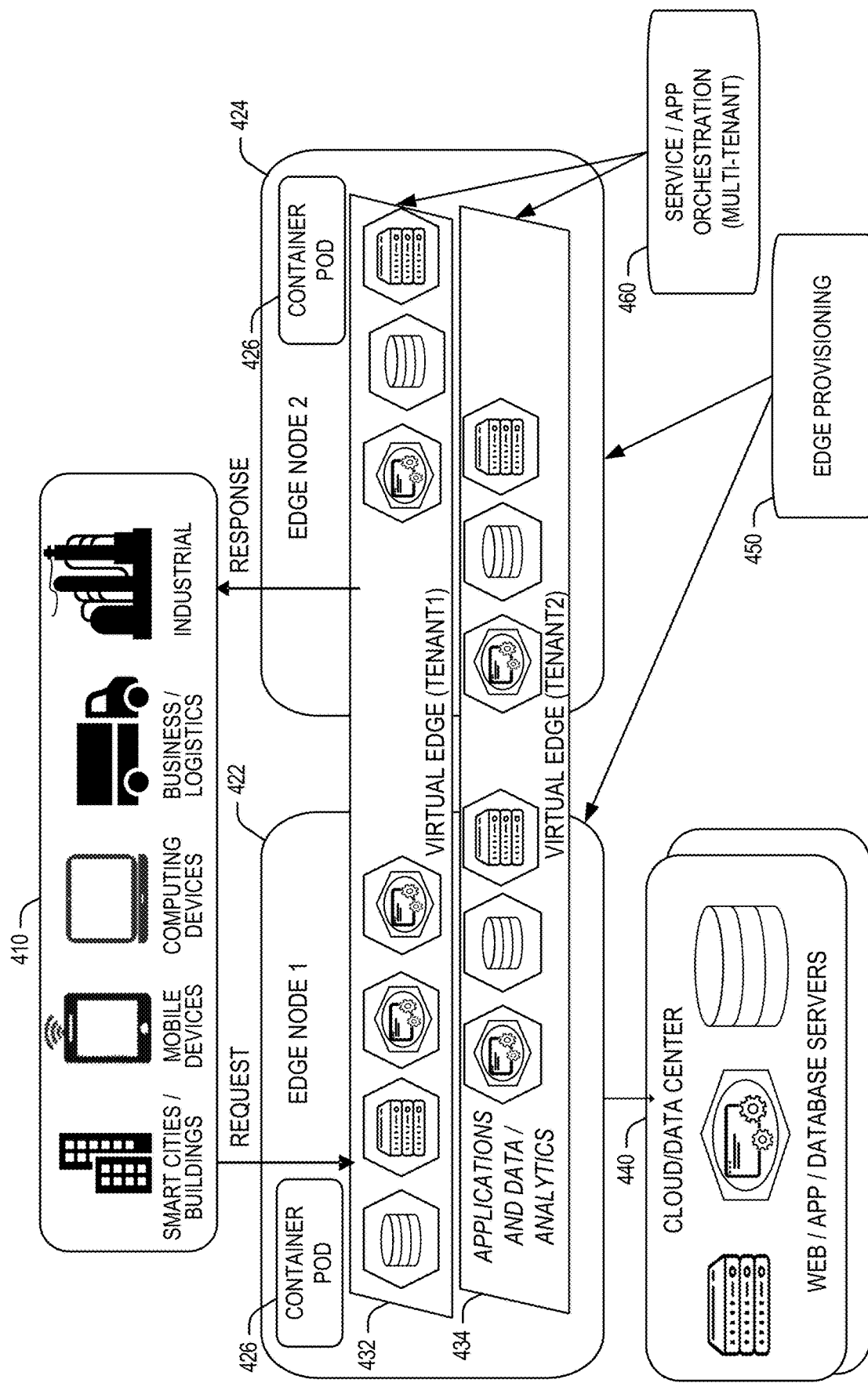
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
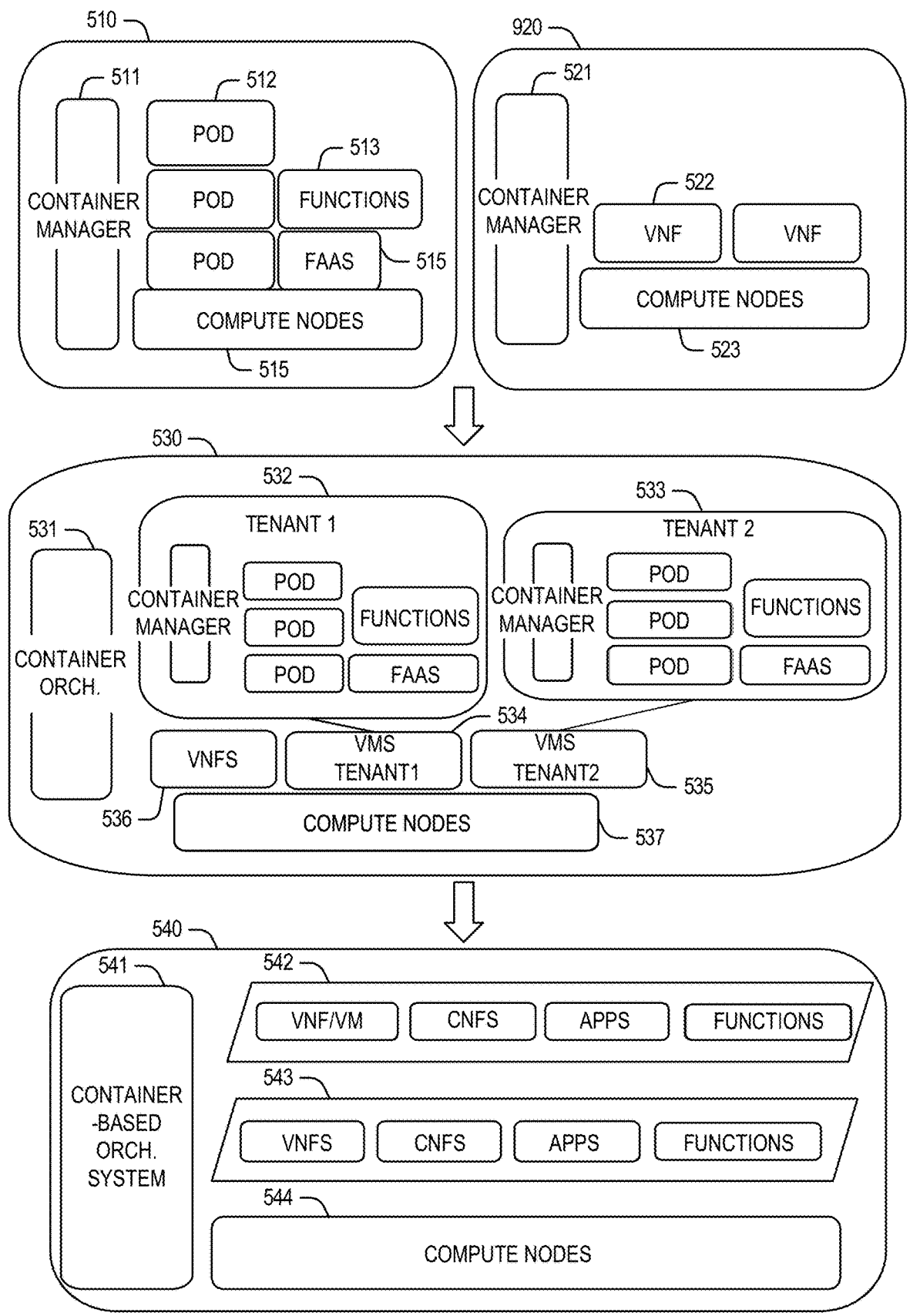
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
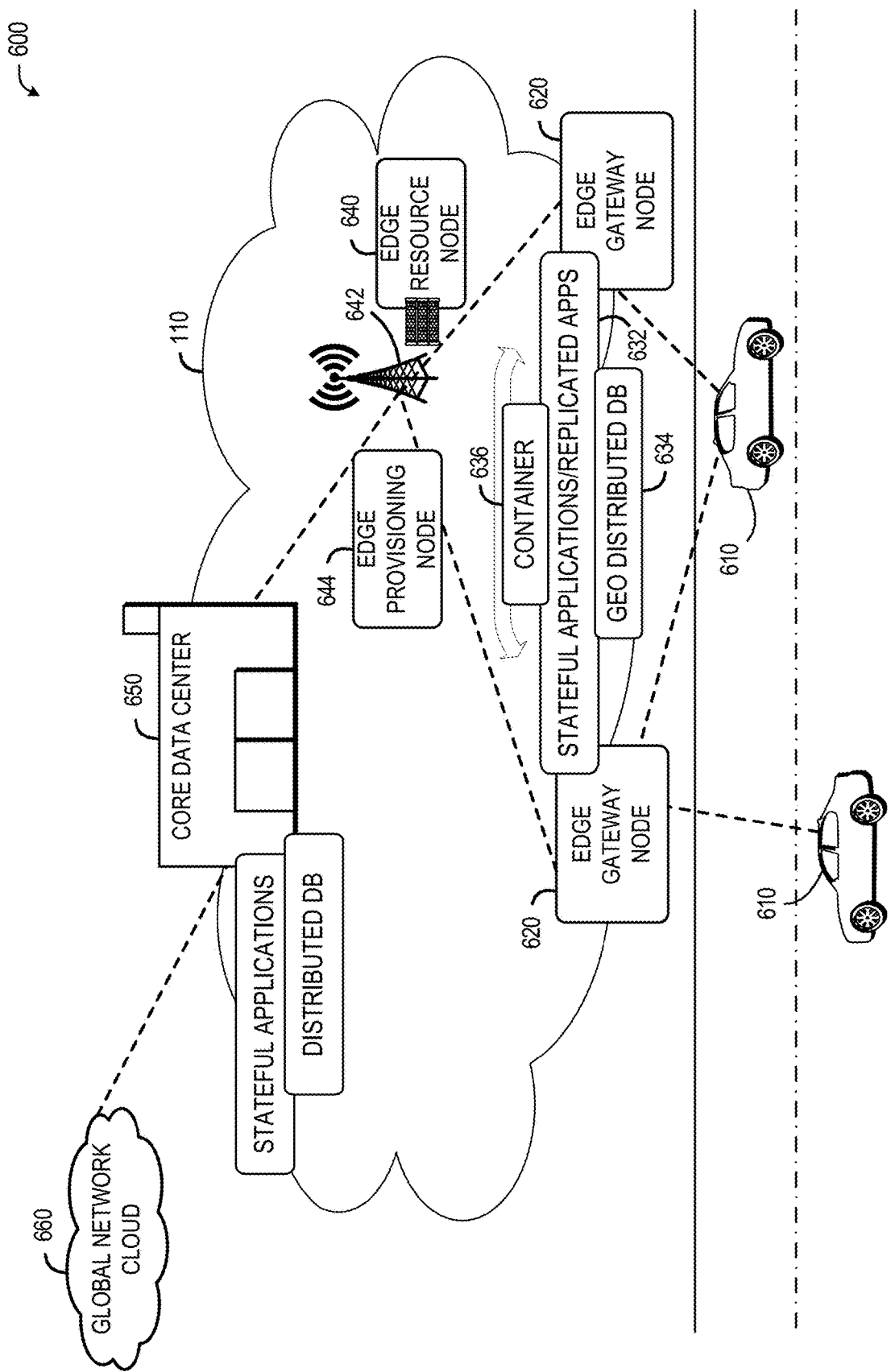
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
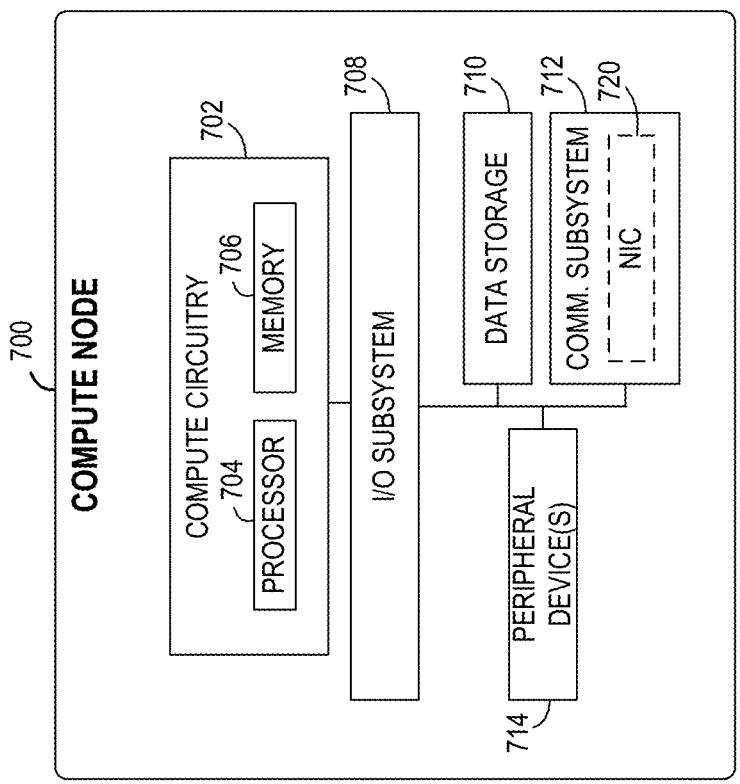
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
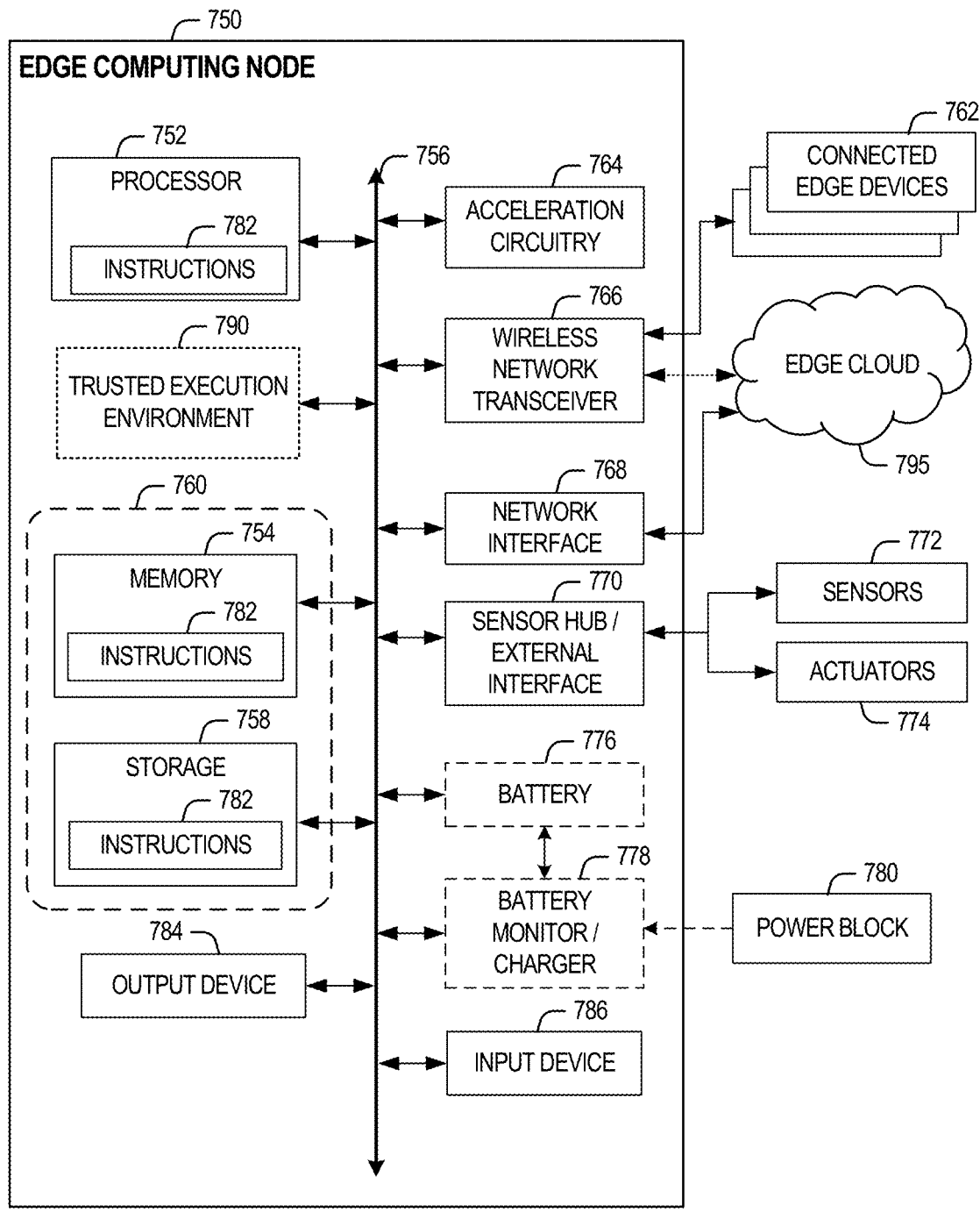
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
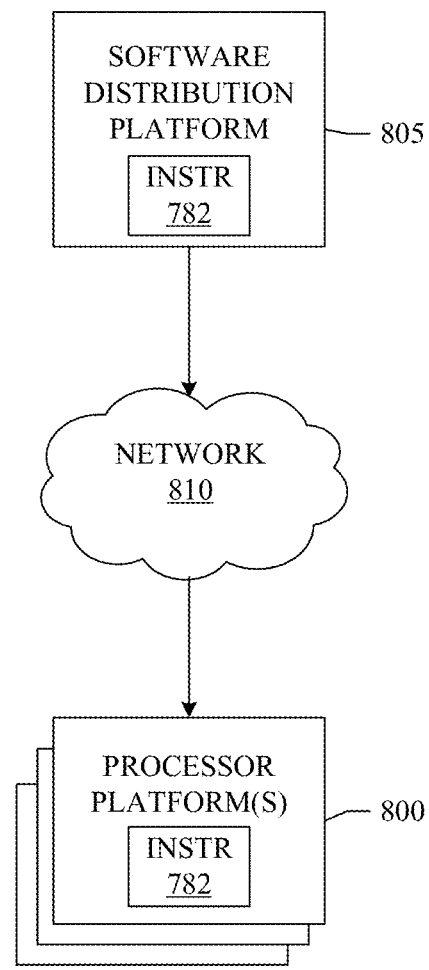
FIG. 8 illustrates an example software distribution platform to distribute software to one or more devices according to an example.

FIG. 8 illustrates an example software distribution platform 805 to distribute software, such as the example computer readable instructions 782 of FIG. 7B, to one or more devices, such as example processor platform(s) 800 or example connected Edge devices. The example software distribution platform 805 may be implemented by any computer server, data facility, cloud service, etc., capable of storing and transmitting software to other computing devices (e.g., third parties, example connected Edge devices, etc.). Example connected Edge devices may be customers, clients, managing devices (e.g., servers), third parties (e.g., customers of an entity owning and/or operating the software distribution platform 805). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 8, the software distribution platform 805 includes one or more servers and one or more storage devices. The one or more servers of the example software distribution platform 805 are in communication with a network 810, which may correspond to any one or more of the Internet or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 805. For example, the software, which may correspond to the example computer readable instructions described herein, may be downloaded to the example processor platform(s) 800 (e.g., example connected Edge devices), which is/are to execute the computer readable instructions 782 to implement the techniques described herein. In some examples, one or more servers of the software distribution platform 805 are communicatively connected to one or more security domains and/or security devices through which requests and transmissions of the example computer readable instructions 782 must pass. In some examples, one or more servers of the software distribution platform 805 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 8, the computer readable instructions 782 are stored on storage devices of the software distribution platform 805 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 805 are in a first format when transmitted to the example processor platform(s) 800. In some examples, the first format is an executable binary in which particular types of the processor platform(s) 800 can execute. However, in some examples, the first format is uncompiled code that requires one or more preparation tasks to transform the first format to a second format to enable execution on the example processor platform(s) 800. For instance, the receiving processor platform(s) 800 may need to compile the computer readable instructions 782 in the first format to generate executable code in a second format that is capable of being executed on the processor platform(s) 800. In still other examples, the first format is interpreted code that, upon reaching the processor platform(s) 800, is interpreted by an interpreter to facilitate execution of instructions.

As discussed above, the systems and methods described herein provide for orchestration of en-route computing. When a message or stream of bytes is sent from a sender to a receiver, it is split up into units (e.g., packets). The packets may be transformed independently from one another, moved independently such as along diverse paths, or the like. The logical relationship among the packets may be reflected in some unit of state encoded into each packet. This state that links the transmitted units to one another may be called a context. The context may itself include a compact reference or identifier that serves as a concise handle to obtain additional background information. The background information (e.g., metadata) may not in general be embodied within the message or stream, or embodied partially in one unit or packet of the message or stream, but not bodily repeated in every other packet.

The contents of the message or stream may be subject to various transformations, filtering, encapsulation, decapsulation, replication, deduplication, etc., not just at the end receiver of the message but also at intermediary nodes along the path from a sender to a receiver, as described here. Such in-the-path computing may be called en-route compute. Example en-route compute may include caching of content at a forward proxy or reverse proxy, encryption or decryption of content, authentication or attestation of sender or receiver, personalization of dynamic content according to the type of content or the receiving party, or the like.

En-route compute operations may be guided by the context or the background information or state that may be navigated from the context. For example, some media frames may be encoded, decoded, transcoded, etc. at a transparent proxy, and this computation may rely on some knowledge of who is receiving the data and what type of device the frames are be displayed on, as well as other factors. En-route compute operations may be considered stateful in general, although some small fraction of these operations may not need state information. An example of a stateless transformation is compression or decompression of packet contents, where some code transmitted with a packet (in a protocol header, for example) indicates the compression or decompression parameters.

One type of en-route compute may occur at or within endpoints, where an endpoint is a sending or receiving application's host. In this example, a software layer within the endpoint offloads various communication affiliated operations from instruction sequences on a general-purpose CPU, for example to a hardware engine in the endpoint. The offloading may include using a CPU purpose-built for those operations. Such offloading may be done at a sending or receiving host in other examples (e.g., from the host's CPUs to other non-CPU devices in the host) or may be performed by offloading various operations from the host's CPUs to processing components available in a gateway or a proxy machine within a host's local network group. The systems and techniques described here may use gateway machines, which include virtualized or containerized abstract machines, as a commonplace extension of an endpoint, and in some examples, the processing at gateways may be synonymous to that at an endpoint.

The systems and techniques described here provide general purpose en-route compute that happens within various devices such as routers, hubs, switches, in the network (e.g., not at an endpoint). These systems and techniques include an expansion of communication intermediaries, extending the communication intermediaries with computational assets. Using those computational assets, run-to-completion operations may be performed as en-route computations actions, such as triggered by events. Software-defined-networking (SDN) may be expanded by including en-route computing, for example to include performing and adapting dynamically inserted computation-boxes alongside routing middleboxes. Serverless computing (e.g., function as a service (FaaS)) that is location agnostic may be combined with statefulness (e.g., using Stateful Serverless at a full network level, not just at endpoints). Statefulness may benefit this type of network by mixing distributed data (state) and distributed computational assets to allow flexible combining of data-shipping-to-functions with function-shipping-to-data, effectively producing dataflow computing, dynamically, at a services level (e.g., not constraining network to be just a carrier of data and endpoints as carriers of computation). Statefulness may improve performance, security, adaptivity, or resiliency of networked interactions by reducing the number of endpoints or end-to-end interactions among computation endpoints, which cause messages to crisscross a network multiple times. These systems and techniques may perform in-network cloud functions.

The en-route computations may be run-to-completion FaaS functions to provide network and client benefits. For example, an en-route computation, as a node in a dataflow graph, may not have latitude to execute indefinitely or have indefinite platform or network dependencies. In an example, a computation may be elastically instantiated, and scaled-to-zero. In an example, en-route computations allow for a shift of focus from servers performing a computation to the computations that are being performed.

Figure 9:
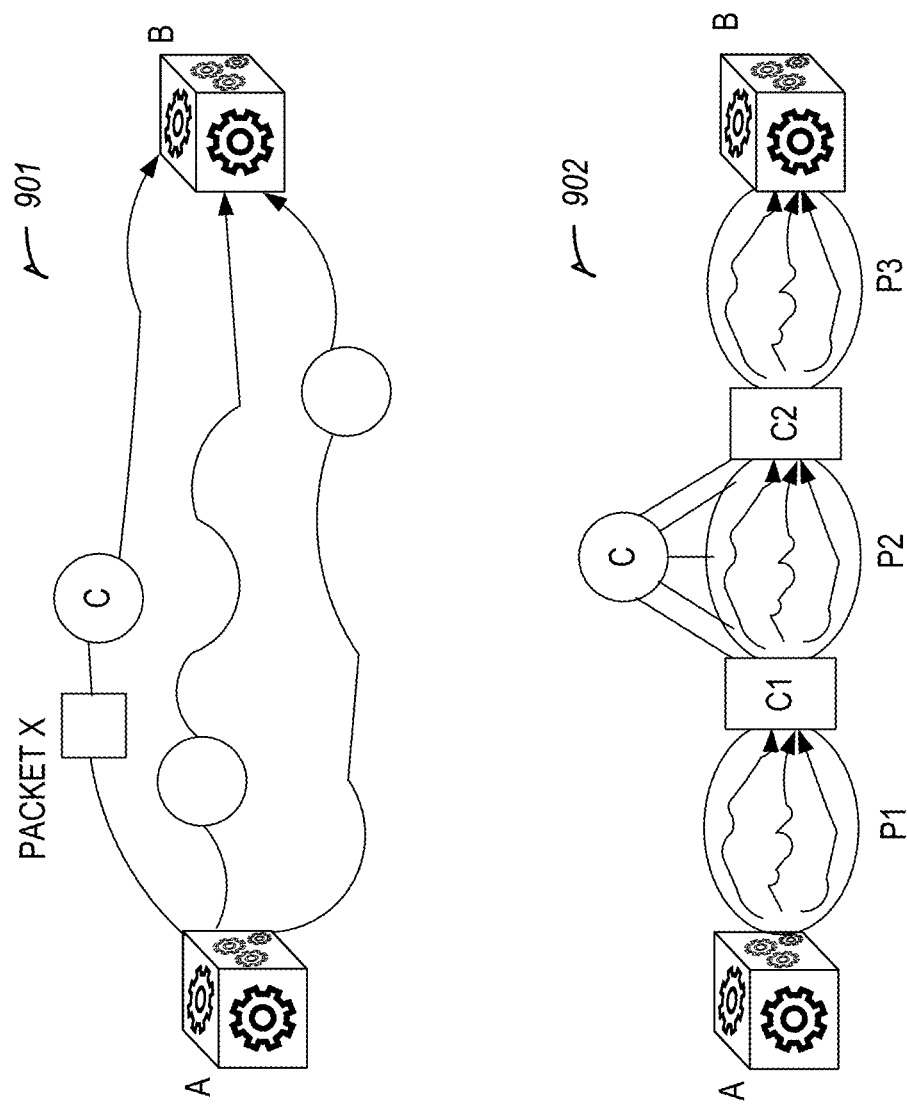
FIG. 9 illustrates two diagrams including different data paths from a source to a destination according to an example.

FIG. 9 illustrates two diagrams 901 and 902 including different data paths from a source to a destination according to an example. In diagram 901, packet X takes a route with intermediary node C, however other packets may not take that route, and may not reach intermediary node C. In diagram 902, all packets reach nodes C1 and C2, though they may take different routes to get to each of these or to the final destination B.

Diagram 902 illustrates a network that supports statefulness. When an application endpoint A talks to another application endpoint B (A to B) it may do so through a set of packet transmissions or remote memory access operations or any other modalities of breaking up what is sent or received, into multiple units and types of data movement. These units may not travel along a common set of paths. When A sends or receives a message to or from B, a message may be identified among the devices that are in the endpoint host of A, even if each device at any point is working on some packet or small chunk of that message. A network between A and B, such as an intermediate device C, may only see a subset of those units as illustrated in diagram 901. In this example, C may not be able to perform an operation O locally on some packet X from A to B, if that operation needs to have access to some other part of the message that is not transiting through C.

In diagram 902, a control plane that orchestrates a channel P between A and B, if it knows that C needs to provide an en-route computation, can orchestrate P as a compound channel P=(P1 to P2 to P3) where P1 is a channel from A to a network intermediary C1, P3 is a channel from a network intermediary C2 to B, and P2 is a channel between C1 and C2 over which all the information that flows is accessible to C. This benefit is the result of the difference between the statefulness network shown in diagram 902 and the stateless network of diagram 901.

Figure 10:
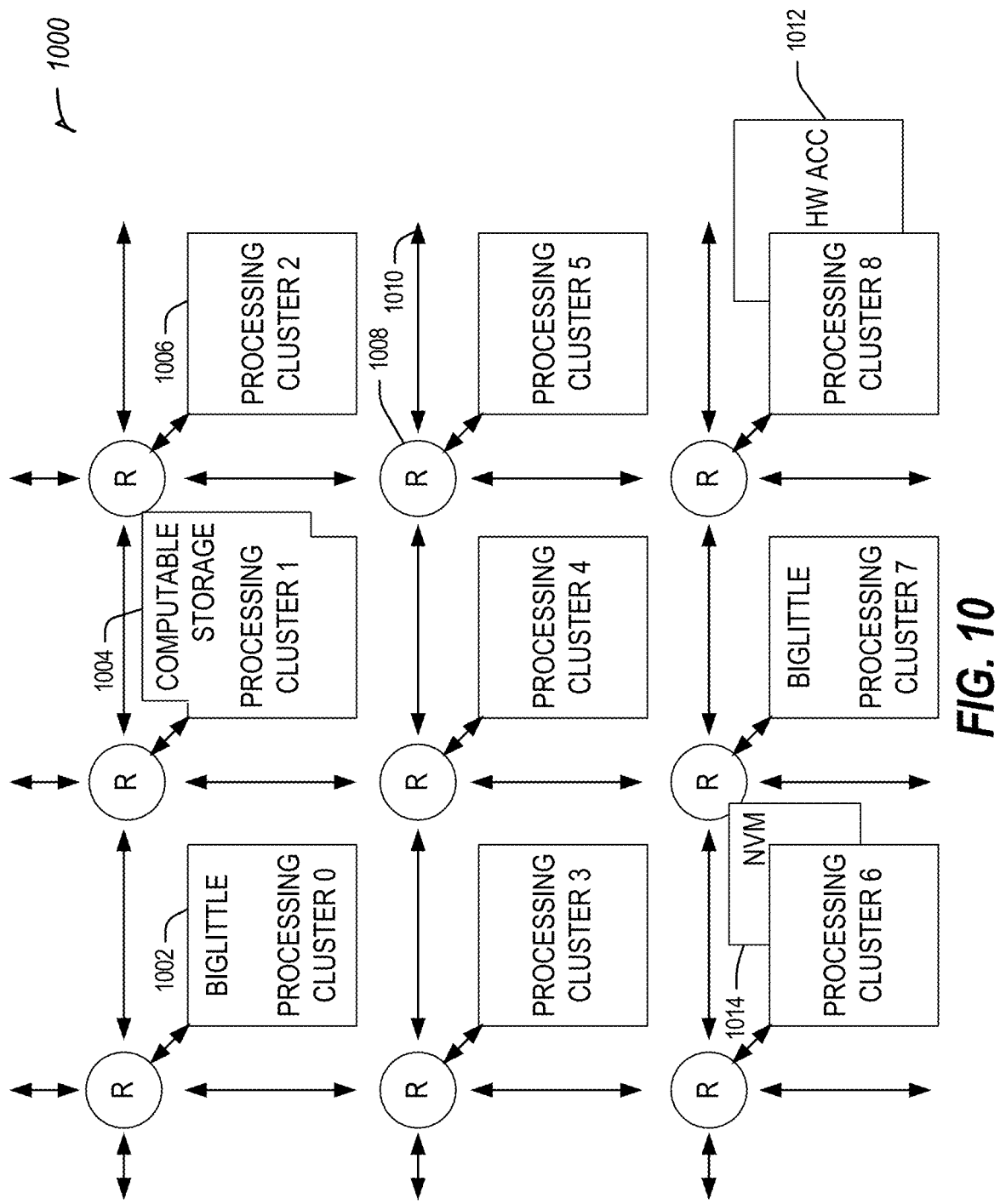
FIG. 10 illustrates an example heterogenous compute-acceleration complex (HCAC) architecture according to an example.

FIG. 10 illustrates an example heterogenous compute-acceleration complex (HCAC) architecture 1000 according to an example. FIG. 10 includes optional components in an example arrangement. These components may be changed, removed, added (e.g., duplicated), moved, etc., and are shown in FIG. 10 as an example. The components may include a big-little processing cluster 1002 (e.g., a hetero-CPU cluster), a computational storage and processing cluster 1004 (e.g., storage with integrated computation), an example processing cluster 1006 (within each cluster, processing elements (PEs) may be tightly coupled, share code, or share data memory), North-South-East-West routing elements 1008, inter-cluster data access and messaging 1010 (e.g., via on-die fabric with synchronization, asynchronization send/receive, or get/put primitives), a hardware accelerator 1012 (some clusters may have hardware acceleration units, such as those specializing in one or more types of operations), non-volatile memory 1014, or the like.

FIG. 10 includes a heterogenous compute-acceleration complex (HCAC) 1000 that is coupled by a fabric with devices like routers, hubs, programmable switches, etc. This example, which is in no way intended to be limiting, illustrates the integration of various computational elements close to points in a network where traffic is funneled for routing and other operations.

The HCAC complex 1000 may include a mesh that ties together a number of component sub-complexes or clusters of processing elements. Each cluster may include a number of CPUs, and physical memory, with the inter-cluster mesh permitting cacheable cross-cluster memory accesses. The inter-cluster mesh may include a highly scalable and optionally cache-coherent fabric such as Compute Express Link (CXL). This fabric may be used for communicating at low latency between the complex and the switch, router, hub, etc., to which the complex is connected.

In an example, some clusters may include a mix of big and small cores (e.g., Xeon, Atom), some clusters may include attached acceleration units (e.g., GPUs, FPGAs, AI accelerators), some clusters may include non-volatile memory, or some clusters may include accelerators tightly integrated with CPUs such as for compression, encryption, or reg-ex, capabilities.

Although not shown in FIG. 10, the HCAC complex 1000 may be equipped with a NIC/SmartNIC by which a high-speed private network may be setup between the complex 1000 and an open-ended number of servers. The servers may provide scaleout capability to the en-route computation complex.

Figure 11:
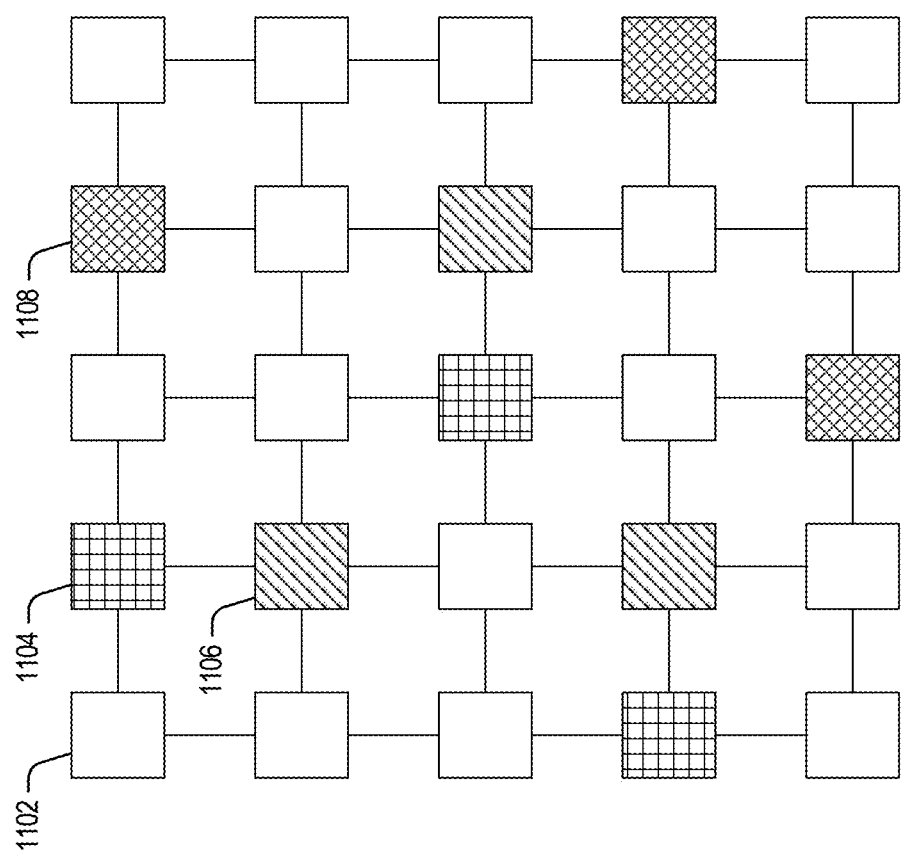
FIG. 11 illustrates example clusters for forming a HCAC according to an example.

FIG. 11 illustrates example clusters for forming a HCAC according to an example. FIG. 11 includes optional components in an example arrangement. These components may be changed, removed, added (e.g., duplicated), moved, etc., and are shown in FIG. 11 as an example. The components may include general processing clusters (e.g., cluster 1102), clusters specialized for crypto (e.g., cluster 1104), clusters specialized for artificial intelligence (e.g., cluster 1106), clusters specialized for confidential computing (CC) (e.g., cluster 1108), or the like.

FIG. 11 includes an example specialization of a HCAC (e.g., HCAC 1000 of FIG. 10). Different clusters in FIG. 11 (represented by various squares, where each shade represents a distinctive specialization) form the HCAC. For example, clusters are included that are specialized for cryptography operations, confidential computing (CC), and AI, among various other specializations. These clusters may be interconnected by a high speed on-die fabric or on motherboard fabric. This means that the specialization provided in a given cluster is available for tightly coupled use by other processing elements in other clusters. In an example, a CC cluster may provide for insulation of HCAC en-route computations performed for one administrative or security or overlay network from others. The CC portion of HCAC may provide for execution of wrappers through which other, ordinary (non-CC) computational assets in other clusters in the HCAC may be exercised anonymously, which may eliminate concerns about side channels.

Figure 12:
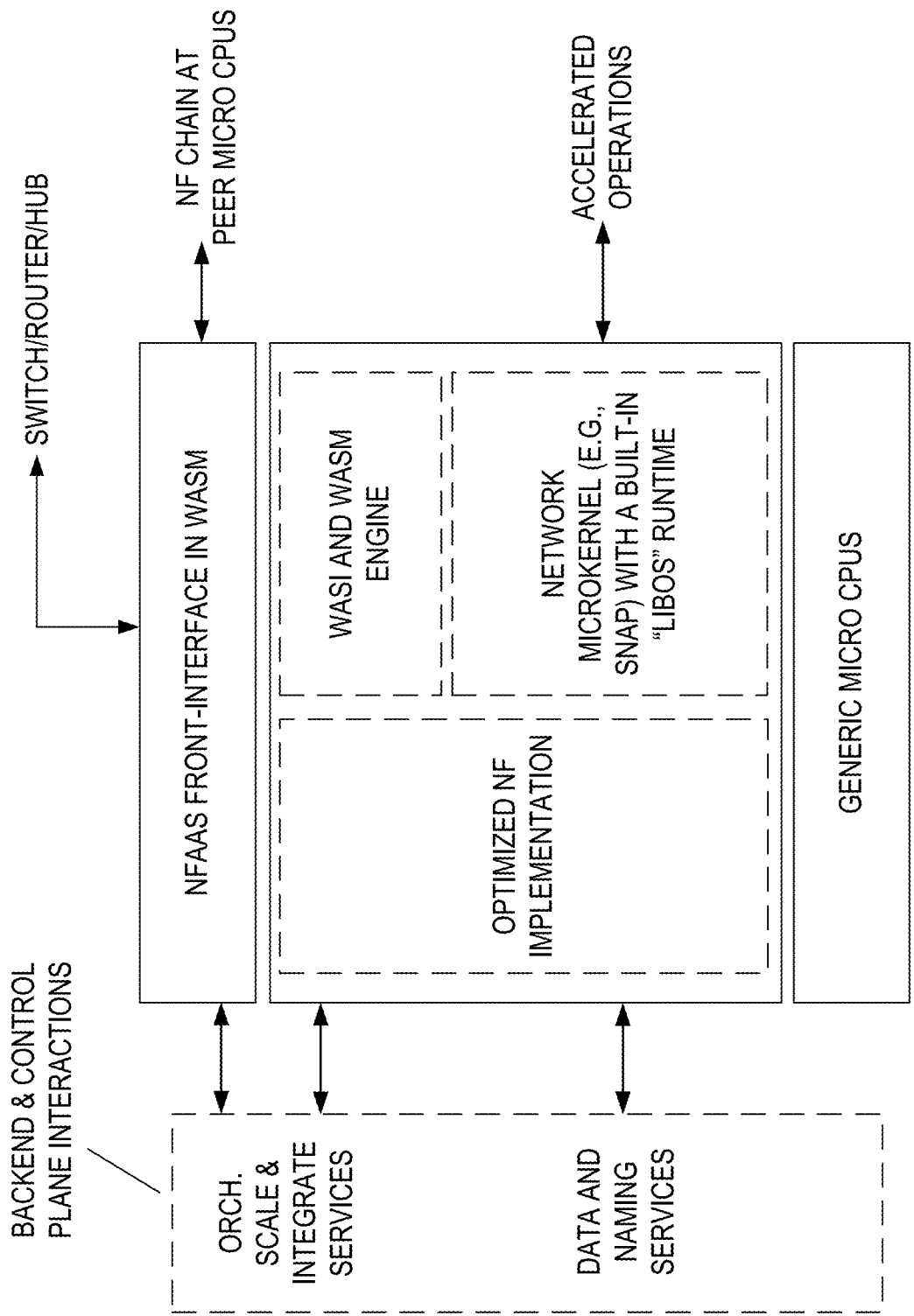
FIG. 12 illustrates an example HCAC implementation according to an example.

FIG. 12 illustrates an example HCAC implementation according to an example. In FIG. 12, the example HCAC includes a high-speed low latency fabric interface to a switch or a hub, to which the HCAC may be communicatively coupled. The HCAC may expose a WASM interface for on-demand execution of en-route computations. In an example, the interface may be called a Network-Functions-as-a-Service (NFaaS) interface. Below this interface may be optimized implementations of various en-route computations, running on the processing elements that may be in one or more of the HCAC's clusters. Network functions (NFs) may be chained as indicated by the bidirectional link shown at the right, which links peer NFs (e.g., as shown in the software view of FIG. 12).

Various communication operations among the peer NFs may be supported by a communication microkernel similar in architecture to the SNAP host networking microkernel, which is a very lightweight mechanism for E-W communications among the peer NFs. The microkernel may include a N-S communication mechanism to communicate with scale out servers that are connected to the HCAC by high speed ethernet links. On the left are shown various data services (e.g., which include namespace management services) such that the en-route computational tasks may refer to state information for any end-to-end flow or message, and which may be maintained or updated across the HCAC clusters.

The computational resources may be provisioned or reclaimed as computations activate and terminate by orchestration services and this block may maintains a registry of computational assets, NF implementations, or specializations available across the HCAC. The HCAC may be tailored for function-as-a-service architecture, in which there is not a need for overheads like operating system, memory management (since the interface is WASM), hypervisor, or thread-pool management (which may be incorporated into the microkernel at the bottom right). Each NF may run with virtual threading, interconnection, and memory services provided by a lightweight library-OS module.

The computational resources available at an HCAC, including specialized capabilities such as CC, AI, NVM, etc., may be represented in an infrastructure database. Included in such a database may be registrations of optimized network function implementations available at various HCAC assets. An orchestration plane may be used that implements a best fit communication-computation strategy and guides an SDN setup that funnels en-route computations into a most optimal HCAC location in the network. Techniques for performing such optimizations may include application-guided to utilization-balancing to randomized to greedy scheduling. In an example, locating en-route computations at end-points may be an initial choice as a default scheduling, and the computations may be migrated into the network progressively (e.g., empirically) or over time, such as by targeting hot NFs first and colder NFs later (e.g., emulating strategies employed in information-centric networks (ICNs) for moving data/tasks closer to requesting points). While this may be similar to the ICN strategy, it differs by incorporating statefulness of computing, security, acceleration, and integration with switching/routing fabric), which ICNs do not do.

Figure 13:
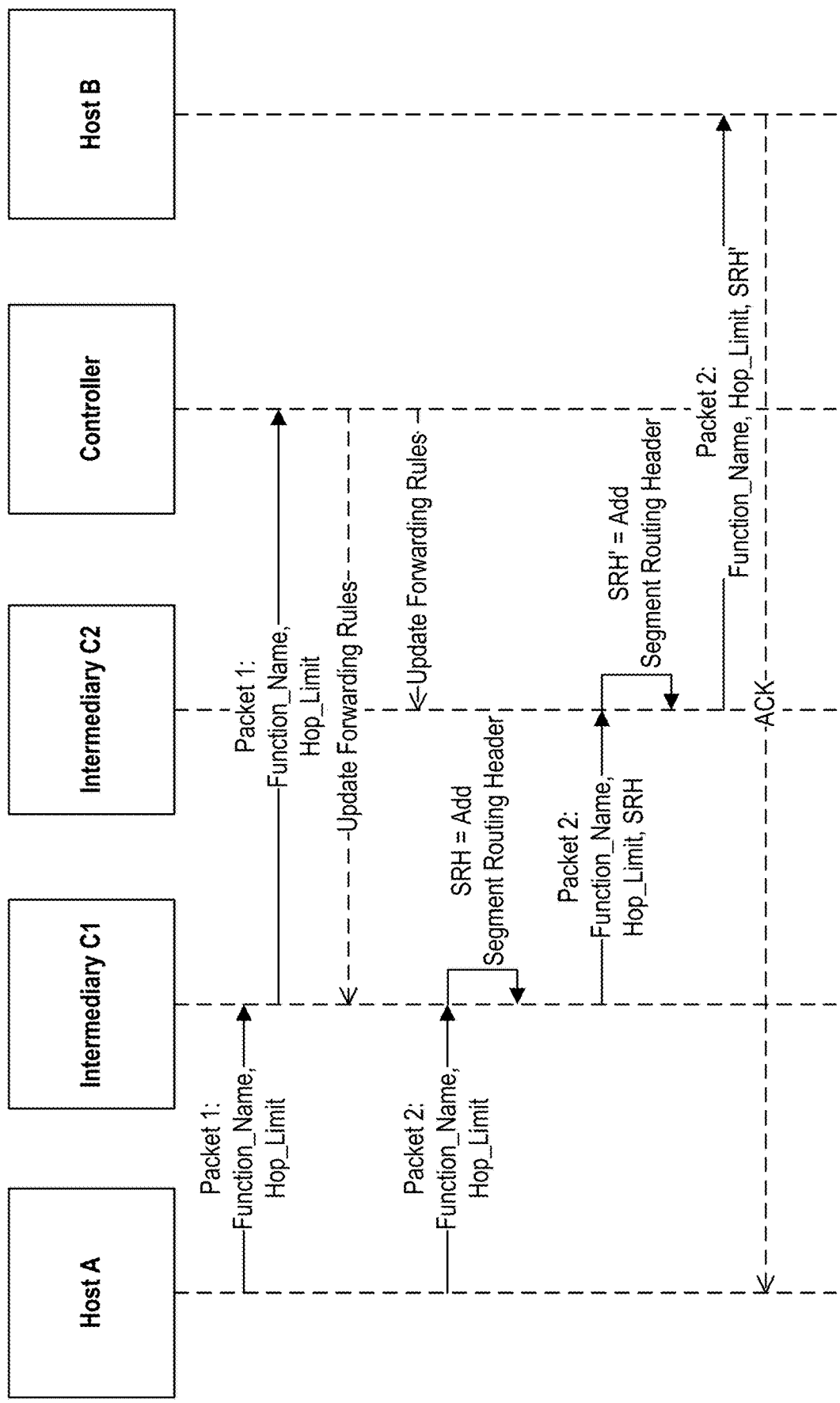
FIG. 13 illustrates a swim lane diagram including compute-communication within a software-defined network (SDN) layer according to an example.

FIG. 13 illustrates a swim lane diagram including compute-communication within a software-defined network (SDN) layer according to an example. Under a traditional SDN framework, a packet coming to a switch or router is redirected to the controller by default if no forwarding rules match with the contents in packet header. In the swim lane diagram shown in FIG. 13, a new opportunity is described, which allows an application to encode a computing or function requirement into a packet header. The controller may select an optimal location of the requested function and data or packet forwarding path based on the header. As shown in FIG. 13, an application looking for a function instance close to the source of data may indicate its desire by encoding requirement (e.g., en-route computing within 2-hops) into a packet header. The first hop switch or router receiving the packet may forward such a request to the controller in case no en-route computing is reachable in 2-hops. Upon reception of such a request, the controller may place the compute nearby or at the appropriate location and configure switch or router by installing forwarding rules such that subsequent packets are forwarded to the newly installed compute instance.

As it described above, multiple packets belonging to the same function may need to go through the same en-route computing instance performing that function (e.g., the same intermediary). Segment routing may be particularly useful in this context as the header of these packets may include desired path information (e.g., a list of intermediary node IDs). In case of a chain of functions, the segment routing header may be re-populated at each computing instance to ensure the correct routing path for the rest of the chain.

Figure 14:
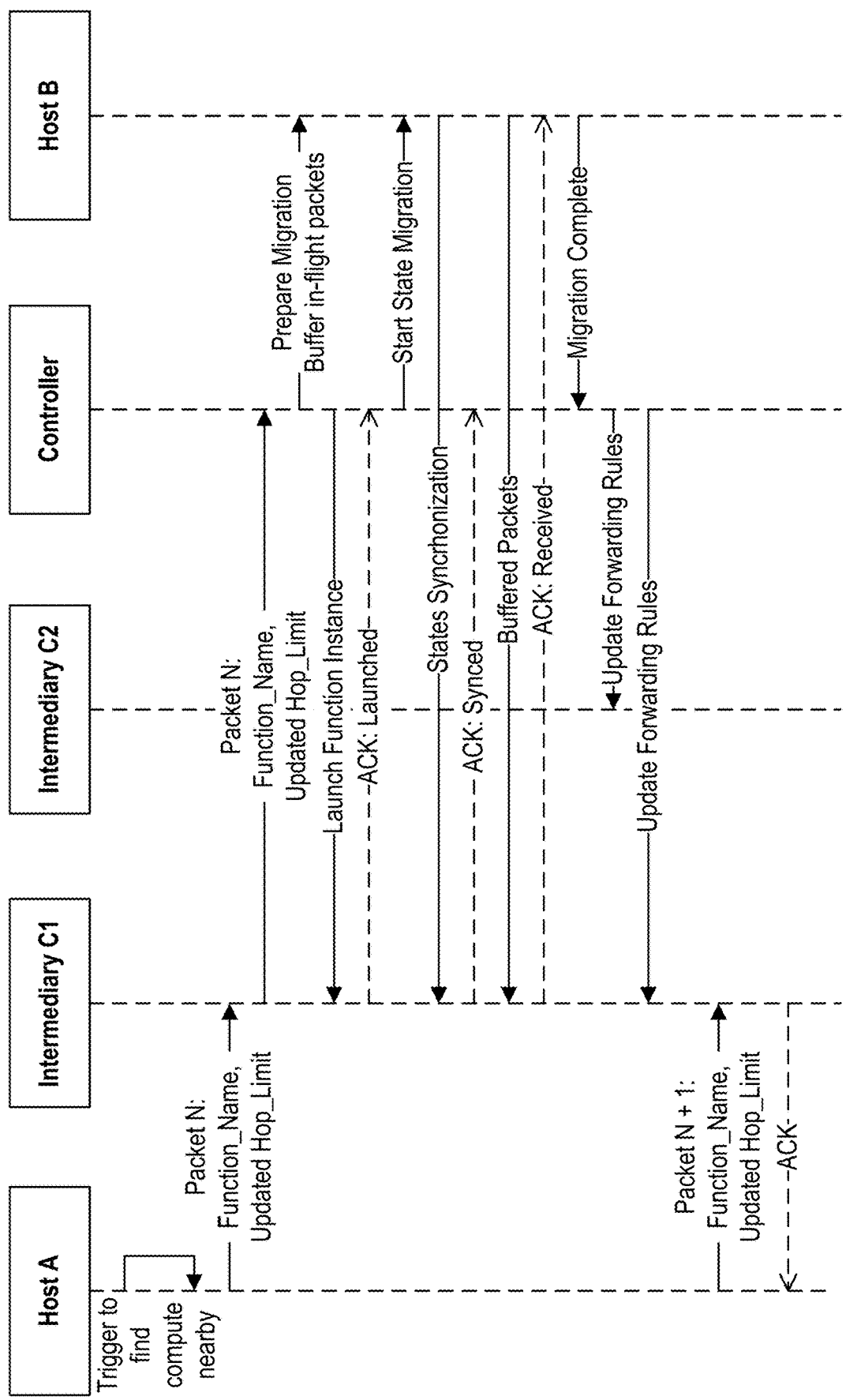
FIG. 14 illustrates a swim lane diagram including use of a controller to identify a HCAC location according to an example.

FIG. 14 illustrates a swim lane diagram including use of a controller to identify a HCAC location according to an example. In FIG. 14, a controller may collect in-band or out-of-band telemetry information to determine networking bottleneck and utilization of in-network computing resources. This information may be used to determine optimal placement of computing instances along the network path. In another example, applications may explicitly request to move or require movement of a function instance from one location to another by sending updated requirements encoded into packet header. The updated request may be routed to the controller, which may make a final decision about the new placement of the function instance. When the controller determines to move or migrate the function from the previous location (e.g., end-host or one en-route entity) to a new en-route HCAC, in-flight packets may be lost. To avoid with this problem, an intermediate entity or the original end host may buffer such packets and transfer them to the newly configured instance after it is operating. The controller may coordinate the buffering and transfer process as shown in FIG. 14.

To improve resiliency, multiple instances may be instantiated. For example, one instance may be instantiated on an en-route with better performance and another on the end-host as a backup. An application may explicitly specify a resiliency requirement to the controller, in some examples. While determining the placement of requested function, the controller may take this requirement in consideration, launch redundant instances, configure forwarding paths (e.g., mutually exclusive, when possible), or the like. When the en-route entity fails, the redundant instance may be reachable via an alternate routing path. A state synchronization protocol may ensure that the states on both sides are aligned.

In an example, computing is placed close to the source of data, which reveals opportunities to optimize or simplify transport layer operations. For example, when a service running on host A is interacting with a function instance one-hop away instead of an instance on host B running multiple hops away, some reliability and flow control requirement may be relaxed (e.g., the first hop's links are not congested etc.). With programmable flow or congestion control support at the transport layer, certain parameters (e.g., window size, round trip time (RTT) threshold, etc.) may be tuned as the placement of computing instances changes.

Figure 15:
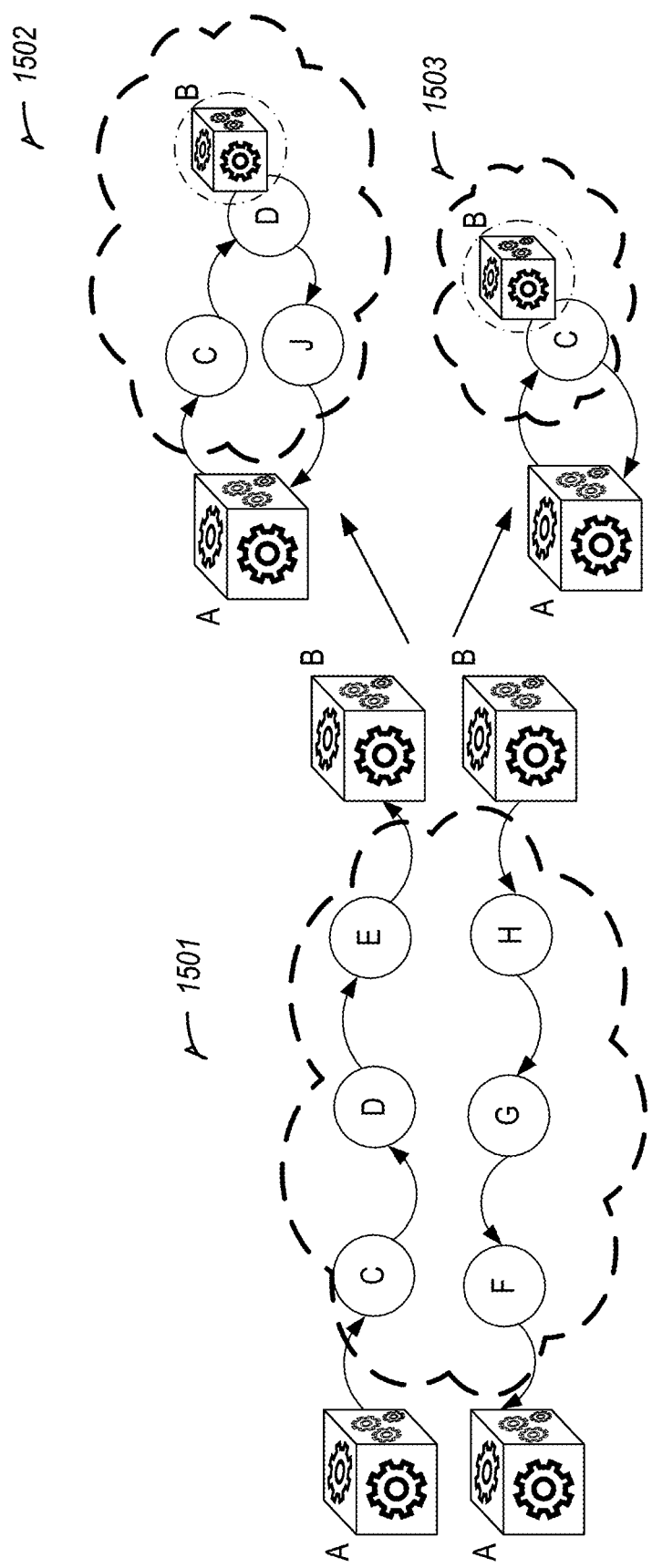
FIG. 15 illustrates example implementations of a request response interaction between two endpoint applications according to an example.

FIG. 15 illustrates example implementations of a request response interaction between two endpoint applications according to an example. In implementation 1501, a request response interaction between two endpoint applications (A) and a FaaS (B) is shown. Nodes C, D, E, are on the request path, and nodes H, G, F are on the response path. These nodes show network intermediaries (e.g., switches, hubs, routers, etc.). In implementation 1502, the computation B is supported at an intermediate HCAC at D, which sends a result/response back to A through a new network intermediary, J. In implementation 1503, the computation B is supported at C, which may be even closer to endpoint for A. In each of the implementations 1502 and 1503 shown in FIG. 15, network bandwidth usage, response latency, and endpoint loading are reduced compared to base implementation 1501. Having more options to situate computation B may improve overall resiliency or security (e.g., with hosting of data and computation tailored to security needs).

FIG. 16 illustrates example implementations of a chain of operations at the application level according to an example. Implementation 1601 of FIG. 16 shows a chain of operations at the application level that split up a monolithic operation into multiple endpoint microservices A, B1, B2, B3, and K. In an example, operations at B1, B2, B3 are all serverless computations, and therefore may be chained and performed at a single or at multiple HCACs en-route from A to K, which is shown in implementation 1602. In implementation 1602, the communication is streamlined, including caching of state, and reduces the number of security operations that may otherwise need to be performed at each of the endpoints.

FIG. 17 illustrates example implementations of an aggregation, filtering, or blending compute operation according to an example. FIG. 17 shows an aggregation or filtering or blending example. In implementation 1701, endpoint apps A and C send data streams to a third endpoint B, which aggregates or filters data it receives from A and C, and then B sends its output to endpoint D. In an example where operation B may perform stateful aggregation at an HCAC point in the network, implementation 1702 illustrates an improved network communication setup. The SDN-compute orchestrator of implementation 1702 moves B from an endpoint server to some intermediate HCAC in the network as shown in the right.

Figure 18:
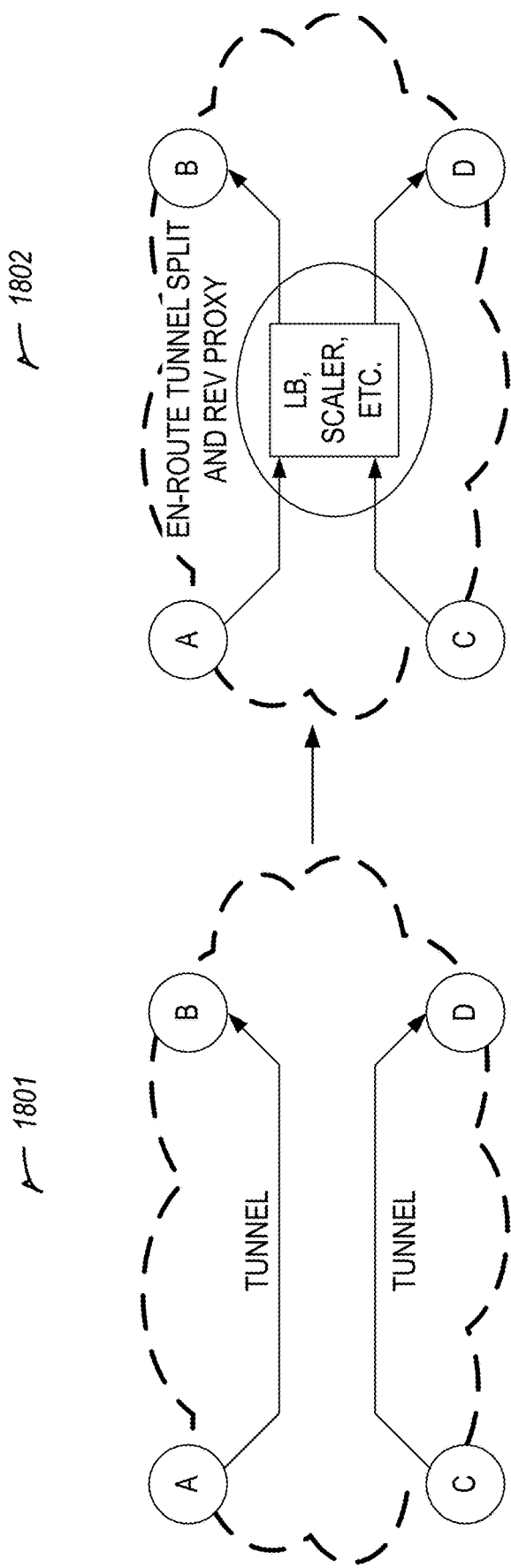
FIG. 18 illustrates example implementations of tunneling according to an example.

FIG. 18 illustrates example implementations of tunneling according to an example. In implementation 1801, is illustrated a situation where a service is performed at endpoints B and D and requested from endpoints A and C. An application-level load balancer may be used to create endpoints B and D as two instances, which are assigned requests originating respectively at A and C for tunneling. Implementation 1802 improves on the setup of implementation 1801 by including a load balancer, scaler, etc., which may be supported at an HCAC. Given the security properties of HCAC, implementation 1802 allows the balancer computation to perform stateful termination of tunnels, performing a multiplexing decision, and redirecting requests dynamically to B, or D, or balancing them. Implementation 1802 allows for dynamic balancing in which request load at B, D, etc., may be elastically balanced, and dynamic SLA policies applied to different requests on a dynamic basis.

Figure 19A:
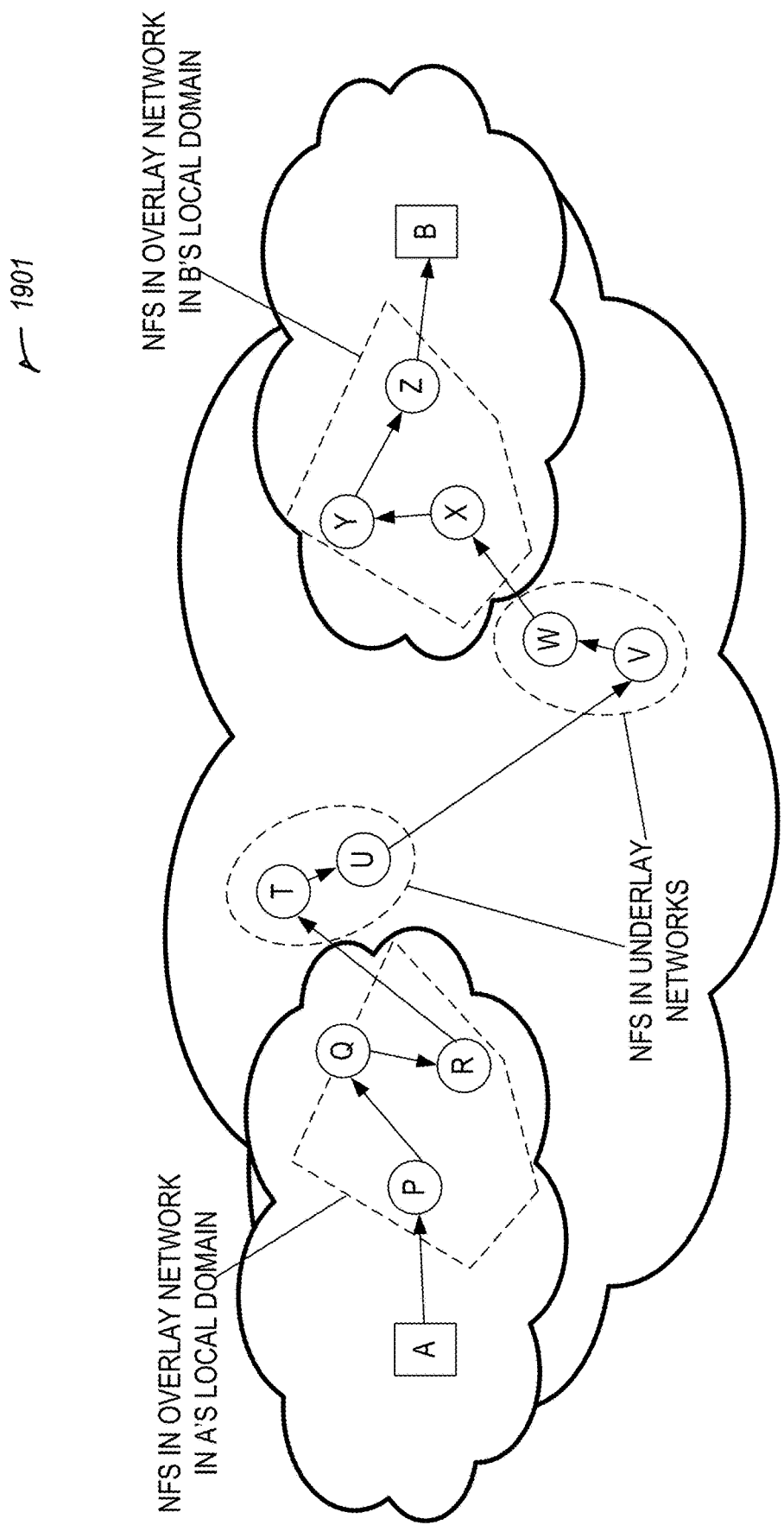
FIGS. 19A-19B illustrates example implementations of network-to-network communications with intermediary network functions according to an example.
Figure 19B:
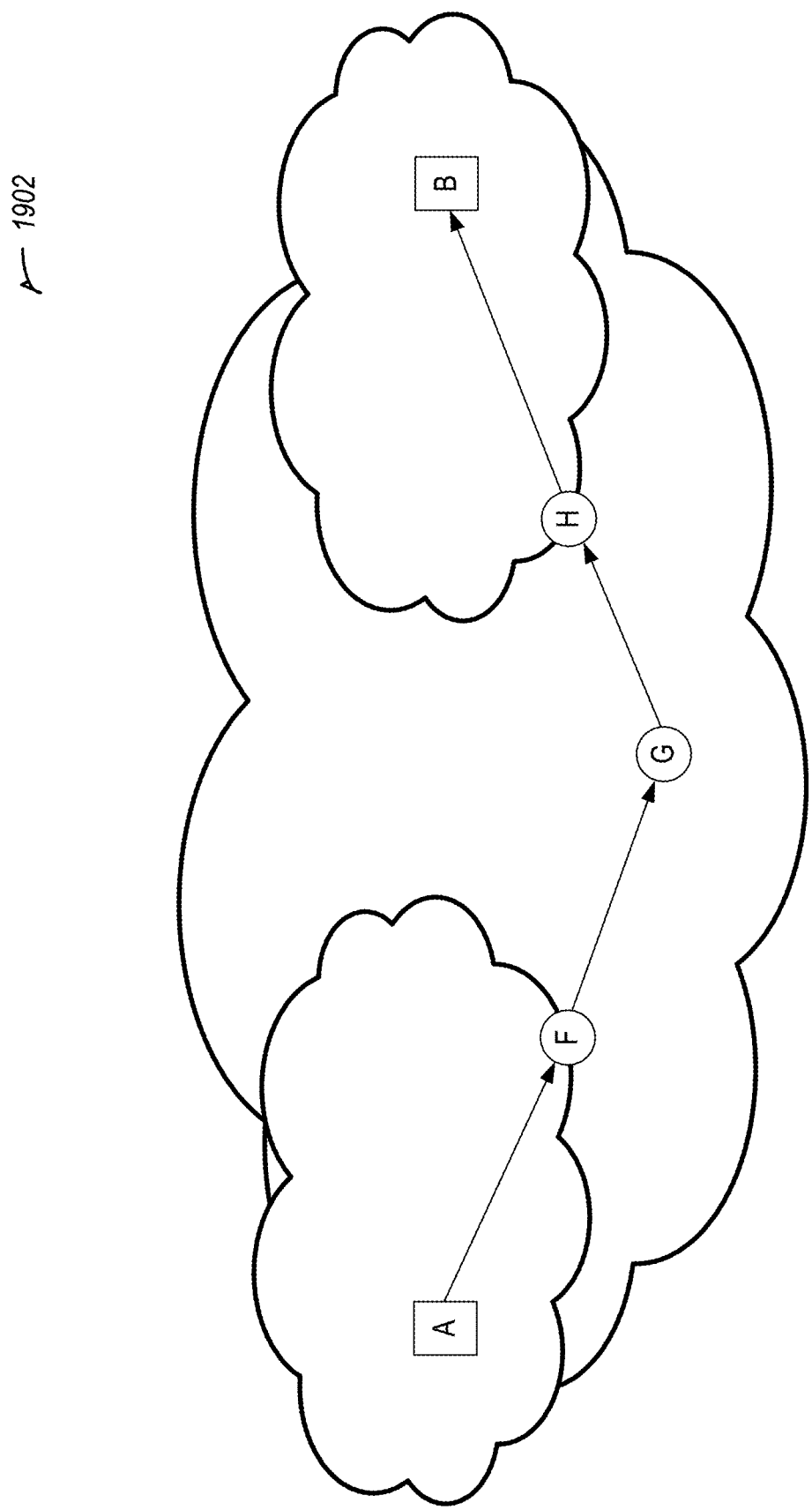

FIGS. 19A-19B illustrates example implementations of network-to-network communications with intermediary network functions according to an example.

Implementation 1901 of FIG. 19A illustrates an example in which endpoints A and B communicate through a number of intermediary network functions. The chain of network functions P, Q, R run in A's local network, which itself may be an overlay network. Similarly, network functions X, Y, Z run in B's local network, which may be an overlay network. One or more underlay networks may support the overall communication between the endpoints A and B. For example, in implementation 1901 one underlay network supports communication between A and B. In the underlay network, additional NFs T, U, V, W are shown to operate in implementation 1901.

With support for HCAC nodes, an alternative implementation 1902 may be used. In implementation 1902, the SDN controller, which is aware of HCAC capabilities, may change the flow such that the underlay network operations are consolidated in intermediary G. Overlay operations and bridging between overlay and underlay networks are shown in implementation 1902 as being consolidated in new NFs F, and H, respectively.

The implementations discussed above with respect to FIGS. 15-19B were "unit" usage scenarios, to simplify the explanation. One benefit that is not evident from just the unit usage scenarios is that en-route computations fused with SDN operations is the combinations of the unit usages that may be achieved. Network functions are used throughout this disclosure as example workloads in various figures, and the frameworks discussed are also applicable to application-level computing, or may accelerate the performance of applications by putting computing primitives (e.g., vector/gradients summation for DNN training, vector multiplication for inference, min/max/count for map-reduce etc.) close to source of data. Network resiliency is not a binary choice at the level of the physical network, and qualitative resiliency experienced by the emerging, data, and computation intensive usages powered by global scale machine to machine and services to services communications enabled by real time AI is important. The qualitative resiliency is reflected in how stable tail latencies are, how scalable the network is together with the applications that run over it, or how much headroom remains to absorb spikes in demand. These metrics are improved by dynamic combining of software-defined networking and software-defined en-route computing.

Figure 20:
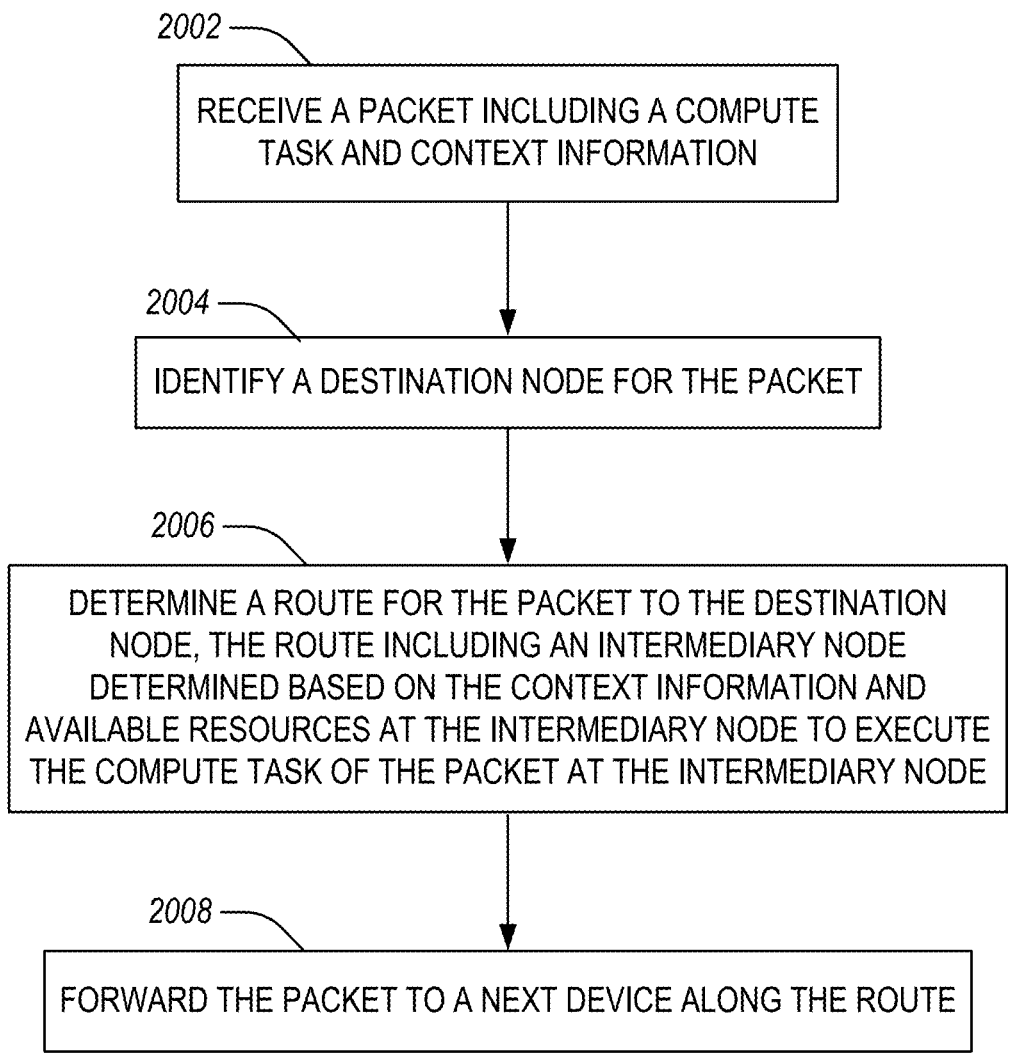
FIG. 20 illustrates a flowchart showing a technique for orchestration of en-route computing according to an example.

FIG. 20 illustrates a flowchart showing a technique 2000 for orchestration of en-route computing according to an example. The technique 2000 may be performed by a device or devices in an edge or datacenter network (e.g., an orchestrator, a base station, a server, a mobile device, an IoT device, or the like).

The technique 2000 includes an operation 2002 to receive a packet including a compute task and context information. In an example, the context information includes data or metadata, such as a relationship of the packet to second packet (e.g., frames within a video or audio, etc.), a number of hops (e.g., a hop limit, which may be general, such as a total hop limit, a hop limit before which a particular task is to be executed, a hop limit among unknown or out of network devices, or the like). In an example, packet may include a QoS parameter (e.g., latency/bandwidth constraints) in addition to or instead of a hop limit. An intermediary node may be determined by a coordinating node based on being within the hop limit or being able to meet the QoS parameter.

In an example, the compute task may include at least one of caching content at a forward proxy or a reverse proxy, encryption of content, decryption of content, authentication, attestation, personalization of dynamic content, cryptography operations, confidential computing, an artificial intelligence task, or the like.

The technique 2000 includes an operation 2004 to identify a destination node for the packet. The technique 2000 includes an operation 2006 to determine a route for the packet to the destination node, the route including an intermediary node determined based on the context information and available resources at the intermediary node to execute the compute task of the packet at the intermediary node. The intermediary node may be a heterogenous compute-acceleration complex including at least two processing clusters, each optimized for a different type of compute task. The intermediary node may include a Network-Functions-as-a-Service (NFaaS) interface to coordinate on-demand execution of en-route computations, including the compute task.

The technique 2000 includes an operation 2008 to forward the packet to a next device along the route. Operation 2008 may include forwarding the second packet to a next node of the second route, the next node of the first route being a different node than the next node of the second route.

When the packet references a second packet, a second route may be determined for the second packet, the second route including the intermediary node. In an example the route and the second route share a second intermediary node for execution of a second compute task, which may be a task of the first packet or the second packet.

In an example, the technique 2000 may include determining, at the coordinating node, a backup intermediary node to replace the intermediary node, in event of failure of the intermediary node. In this example, the technique 2000 may include determining a third route for the first packet and optionally a fourth route for the second packet, where applicable. The third route or the fourth route may include the backup intermediary node.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is a coordinating node of an edge network, the coordinating node comprising: processing circuitry; and memory including instructions, which when executed by the processing circuitry, cause the processing circuitry to perform operations including: receiving a first packet including a compute task and a reference to a second packet; identifying a destination node for the first packet; determining a first route for the first packet to the destination node, the first route including an intermediary node determined based on available resources at the intermediary node to execute the compute task of the first packet at the intermediary node; determining a second route for the second packet to the destination node, the second route including the intermediary node; forwarding the first packet to a next node along the first route.

In Example 2, the subject matter of Example 1 includes, wherein the first packet includes a context that defines a relationship between the first packet and the second packet.

In Example 3, the subject matter of Examples 1-2 includes, wherein the compute task includes at least one of caching content at a forward proxy or a reverse proxy, encryption of content, decryption of content, authentication, attestation, personalization of dynamic content, cryptography operations, confidential computing, or an artificial intelligence task.

In Example 4, the subject matter of Examples 1-3 includes, wherein the first route and the second route share a second intermediary node for execution of a second compute task of the first packet or the second packet.

In Example 5, the subject matter of Examples 1-4 includes, wherein the intermediary node is a heterogenous compute-acceleration complex including at least two processing clusters, each optimized for a different type of compute task.

In Example 6, the subject matter of Examples 1-5 includes, wherein the intermediary node includes a Network-Functions-as-a-Service (NFaaS) interface to coordinate on-demand execution of en-route computations, including the compute task.

In Example 7, the subject matter of Examples 1-6 includes, wherein the first packet includes a hop limit, and wherein the intermediary node is determined based on being within the hop limit from the coordinating node.

In Example 8, the subject matter of Examples 1-7 includes, operations including determining, at the coordinating node, a backup intermediary node to replace the intermediary node, in event of failure of the intermediary node.

In Example 9, the subject matter of Example 8 includes, wherein determining the backup intermediary node includes determining a third route for the first packet and a fourth route for the second packet, wherein the third route and the fourth route include the backup intermediary node.

In Example 10, the subject matter of Examples 1-9 includes, wherein forwarding the first packet to the next node of the first route includes forwarding the second packet to a next node of the second route, the next node of the first route being a different node than the next node of the second route.

Example 11 is a method comprising: receiving, at a coordinating node, a first packet including a compute task and a reference to a second packet; identifying a destination node for the first packet; determining a first route for the first packet to the destination node, the first route including an intermediary node determined based on available resources at the intermediary node to execute the compute task of the first packet at the intermediary node; determining a second route for the second packet to the destination node, the second route including the intermediary node; forwarding, from the coordinating node, the first packet to a next node along the first route.

In Example 12, the subject matter of Example 11 includes, determining, at the coordinating node, a backup intermediary node to replace the intermediary node, in event of failure of the intermediary node.

In Example 13, the subject matter of Example 12 includes, wherein determining the backup intermediary node includes determining a third route for the first packet and a fourth route for the second packet, wherein the third route and the fourth route include the backup intermediary node.

In Example 14, the subject matter of Examples 11-13 includes, wherein the first route includes a second intermediary node determined based on available resources at the second intermediary node to execute a second compute task of the first packet at the second intermediary node, wherein the second route includes the second intermediary node.

Example 15 is an apparatus comprising: means for receiving, at a coordinating node, a first packet including a compute task and a reference to a second packet; means for identifying a destination node for the first packet; means for determining a first route for the first packet to the destination node, the first route including an intermediary node determined based on available resources at the intermediary node to execute the compute task of the first packet at the intermediary node; means for determining a second route for the second packet to the destination node, the second route including the intermediary node; means for forwarding, from the coordinating node, the first packet to a next node along the first route.

In Example 16, the subject matter of Example 15 includes, wherein the first packet includes a context that defines a relationship between the first packet and the second packet.

In Example 17, the subject matter of Examples 15-16 includes, wherein the compute task includes at least one of caching content at a forward proxy or a reverse proxy, encryption of content, decryption of content, authentication, attestation, personalization of dynamic content, cryptography operations, confidential computing, or an artificial intelligence task.

Example 18 is a coordinating node of an edge network, the coordinating node comprising: processing circuitry; and memory including instructions, which when executed by the processing circuitry, cause the processing circuitry to perform operations including: receiving a packet including a compute task and context information; identifying a destination node for the packet; determining a route for the packet to the destination node, the route including an intermediary node determined based on the context information and available resources at the intermediary node to execute the compute task of the packet at the intermediary node; forwarding the packet to a next node along the route.

In Example 19, the subject matter of Examples 1-18 includes, wherein the compute task includes at least one of caching content at a forward proxy or a reverse proxy, encryption of content, decryption of content, authentication, attestation, personalization of dynamic content, cryptography operations, confidential computing, or an artificial intelligence task.

In Example 20, the subject matter of Examples 1-19 includes, wherein the intermediary node is a heterogenous compute-acceleration complex including at least two processing clusters, each optimized for a different type of compute task.

In Example 21, the subject matter of Examples 1-20 includes, wherein the intermediary node includes a Network-Functions-as-a-Service (NFaaS) interface to coordinate on-demand execution of en-route computations, including the compute task.

In Example 22, the subject matter of Examples 1-21 includes, wherein the packet includes a hop limit, and wherein the intermediary node is determined based on being within the hop limit from the coordinating node.

In Example 23, the subject matter of Examples 1-22 includes, operations including determining, at the coordinating node, a backup intermediary node to replace the intermediary node, in event of failure of the intermediary node.

In Example 24, the subject matter of Examples 8-23 includes, wherein determining the backup intermediary node includes determining a second route for the packet, the second route including the backup intermediary node.

In Example 25, the subject matter of Examples 1-24 includes, wherein the route includes a second intermediary node determined based on available resources at the second intermediary node to execute a second compute task of the packet at the second intermediary node, wherein the second route includes the second intermediary node.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A coordinating node of a network, the coordinating node comprising:
processing circuitry; and
memory including instructions, which when executed by the processing circuitry, cause the processing circuitry to perform operations including:
receiving a first packet including a compute task and a reference to a second packet, the compute task having a hop limit;
identifying a destination node for the first packet;
determining a first route for the first packet to the destination node, the first route including an intermediary node determined based on available resources at the intermediary node to execute the compute task of the first packet at the intermediary node, and based on the hop limit of the compute task;
determining a second route for the second packet to the destination node, the second route including the intermediary node; and
forwarding the first packet to a next node along the first route.

2. The coordinating node of claim 1, wherein the first packet includes a context that defines a relationship between the first packet and the second packet.

3. The coordinating node of claim 1, wherein the compute task includes at least one of caching content at a forward proxy or a reverse proxy, encryption of content, decryption of content, authentication, attestation, personalization of dynamic content, cryptography operations, confidential computing, or an artificial intelligence task.

4. The coordinating node of claim 1, wherein the first route and the second route share a second intermediary node for execution of a second compute task of the first packet or the second packet.

5. The coordinating node of claim 1, wherein the intermediary node is a heterogenous compute-acceleration complex including at least two processing clusters, each optimized for a different type of compute task.

6. The coordinating node of claim 1, wherein the intermediary node includes a Network-Functions-as-a-Service (NFaaS) interface to coordinate on-demand execution of en-route computations, including the compute task.

7. The coordinating node of claim 1, wherein the first packet includes a hop limit, and wherein the intermediary node is determined based on being within the hop limit from the coordinating node.

8. The coordinating node of claim 1, further comprising operations including determining, at the coordinating node, a backup intermediary node to replace the intermediary node, in event of failure of the intermediary node.

9. The coordinating node of claim 8, wherein determining the backup intermediary node includes determining a third route for the first packet and a fourth route for the second packet, wherein the third route and the fourth route include the backup intermediary node.

10. The coordinating node of claim 1, wherein forwarding the first packet to the next node of the first route includes forwarding the second packet to a next node of the second route, the next node of the first route being a different node than the next node of the second route.

11. A method comprising:
receiving, at a coordinating node, a first packet including a compute task and a reference to a second packet, the compute task having a hop limit;
identifying a destination node for the first packet;
determining a first route for the first packet to the destination node, the first route including an intermediary node determined based on available resources at the intermediary node to execute the compute task of the first packet at the intermediary node, and based on the hop limit of the compute task;
determining a second route for the second packet to the destination node, the second route including the intermediary node; and
forwarding, from the coordinating node, the first packet to a next node along the first route.

12. The method of claim 11, further comprising determining, at the coordinating node, a backup intermediary node to replace the intermediary node, in event of failure of the intermediary node.

13. The method of claim 12, wherein determining the backup intermediary node includes determining a third route for the first packet and a fourth route for the second packet, wherein the third route and the fourth route include the backup intermediary node.

14. The method of claim 11, wherein the first route includes a second intermediary node determined based on available resources at the second intermediary node to execute a second compute task of the first packet at the second intermediary node, wherein the second route includes the second intermediary node.

15. An apparatus comprising:
means for receiving, at a coordinating node, a first packet including a compute task and a reference to a second packet, the compute task having a hop limit;
means for identifying a destination node for the first packet;
means for determining a first route for the first packet to the destination node, the first route including an intermediary node determined based on available resources at the intermediary node to execute the compute task of the first packet at the intermediary node, and based on the hop limit of the compute task;
means for determining a second route for the second packet to the destination node, the second route including the intermediary node; and
means for forwarding, from the coordinating node, the first packet to a next node along the first route.

16. The apparatus of claim 15, wherein the first packet includes a context that defines a relationship between the first packet and the second packet.

17. The apparatus of claim 15, wherein the compute task includes at least one of caching content at a forward proxy or a reverse proxy, encryption of content, decryption of content, authentication, attestation, personalization of dynamic content, cryptography operations, confidential computing, or an artificial intelligence task.

18. A coordinating node of a network, the coordinating node comprising:
processing circuitry; and
memory including instructions, which when executed by the processing circuitry, cause the processing circuitry to perform operations including:
receiving a packet including a compute task and context information, the compute task having a hop limit;
identifying a destination node for the packet;
determining a route for the packet to the destination node, the route including an intermediary node determined based on the context information and available resources at the intermediary node to execute the compute task of the packet at the intermediary node, and based on the hop limit of the compute task; and
forwarding the packet to a next node along the route.

19. The coordinating node of claim 18, wherein the compute task includes at least one of caching content at a forward proxy or a reverse proxy, encryption of content, decryption of content, authentication, attestation, personalization of dynamic content, cryptography operations, confidential computing, or an artificial intelligence task.

20. The coordinating node of claim 18, wherein the intermediary node is a heterogenous compute-acceleration complex including at least two processing clusters, each optimized for a different type of compute task.

21. The coordinating node of claim 18, wherein the intermediary node includes a Network-Functions-as-a-Service (NFaaS) interface to coordinate on-demand execution of en-route computations, including the compute task.

22. The coordinating node of claim 18, wherein the packet includes a hop limit, and wherein the intermediary node is determined based on being within the hop limit from the coordinating node.

23. The coordinating node of claim 18, further comprising operations including determining, at the coordinating node, a backup intermediary node to replace the intermediary node, in event of failure of the intermediary node.

24. The coordinating node of claim 23, wherein determining the backup intermediary node includes determining a second route for the packet, the second route including the backup intermediary node.

25. The coordinating node of claim 18, wherein the route includes a second intermediary node determined based on available resources at the second intermediary node to execute a second compute task of the packet at the second intermediary node, wherein the second route includes the second intermediary node.

* * * * *